(12) United States Patent
Kousaridas et al.

(10) Patent No.: US 11,368,879 B2
(45) Date of Patent: Jun. 21, 2022

(54) TECHNIQUES FOR NOTIFYING A QUALITY OF SERVICE CHANGE

(71) Applicant: Huawei Technologies Co., Ltd., Shenzhen (CN)

(72) Inventors: Apostolos Kousaridas, Munich (DE); Emmanouil Pateromichelakis, Munich (DE); Chan Zhou, Munich (DE); Xueli An, Munich (DE); Chenghui Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 16/859,679

(22) Filed: Apr. 27, 2020

(65) Prior Publication Data

US 2020/0260333 A1 Aug. 13, 2020

Related U.S. Application Data

(63) Continuation of application No. PCT/EP2107/077462, filed on Oct. 26, 2017.

(51) Int. Cl.
*H04W 28/24* (2009.01)
*H04W 4/40* (2018.01)

(52) U.S. Cl.
CPC ............. *H04W 28/24* (2013.01); *H04W 4/40* (2018.02)

(58) Field of Classification Search
None
See application file for complete search history.

(56) References Cited

U.S. PATENT DOCUMENTS

2003/0223359 A1* 12/2003 Einstein .................. H04L 45/22
370/228
2012/0020213 A1* 1/2012 Horneman ........ H04W 28/0289
370/231
(Continued)

FOREIGN PATENT DOCUMENTS

CN 102422703 A 4/2012
DE 102014213304 A1 1/2016
WO 2015193727 A1 12/2015

OTHER PUBLICATIONS

"Perspectives on Vertical Industries and Implications for 5G," Version:1.0, NGMN P1 WS#2 Verticals, NGMN Board, pp. 1-29 (Jun. 10, 2016).

(Continued)

*Primary Examiner* — Lonnie V Sweet
(74) *Attorney, Agent, or Firm* — Leydig, Voit & Mayer, Ltd.

(57) ABSTRACT

The disclosure relates to a mobile device configured to receive from a network a notification of a predicted change of a Quality-of-Service, QoS related to a local end-to-end data communication path; and configured to provide a report to the network, the report comprising at least one of the following information: location information, application layer information, mobile device status information, experienced QoS at mobile device side, radio channel conditions. The disclosure further relates to a network device configured to transceive communication data via a communication path, in particular a local end-to-end data communication path between a mobile device and another mobile device, based on a Quality-of-Service, QoS, requirement for the communication path; and configured to notify the mobile device about a predicted change of the QoS related to the communication path.

16 Claims, 15 Drawing Sheets

(56) References Cited

U.S. PATENT DOCUMENTS

2018/0295628 A1* 10/2018 Lu .................. H04L 5/0058
2018/0302807 A1* 10/2018 Chen ................ H04L 45/22
2020/0169943 A1* 5/2020 Zhang .............. H04W 76/23

OTHER PUBLICATIONS

"3rd Generation Partnership Project; Technical Specification Group Services and System Aspects; Enhancement of 3GPP support for V2X scenarios; Stage 1 (Release 15)," 3GPP TS 22.186 V15.0.0, pp. 1-16, 3rd Generation Partnership Project, Valbonne, France (Mar. 2017).

"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.4.0, pp. 1-486, 3rd Generation Partnership Project, Valbonne, France (Jun. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Study on New Radio Access Technology; Radio Interface Protocol Aspects (Release 14)," 3GPP TR 38.804 V14.0.0, pp. 1-57, 3rd Generation Partnership Project, Valbonne, France (Mar. 2017).

* cited by examiner

TECHNIQUES FOR NOTIFYING A QUALITY OF SERVICE CHANGE

CROSS-REFERENCE TO RELATED APPLICATIONS

This application is a continuation of International Application No. PCT/EP2017/077462, filed on Oct. 26, 2017, the disclosure of which is hereby incorporated by reference in its entirety.

TECHNICAL FIELD

The present disclosure relates to techniques for notifying a Quality of Service (QoS) change. In particular the disclosure relates to a mobile device, in particular a vehicle, receiving such notification of QoS change and a network device, in particular a base station or a mobility management entity transmitting such notification. The disclosure further relates to a corresponding method for notifying an estimated and/or expected change of QoS.

BACKGROUND

With the advent of automated driving functions, vehicles will be connected and they will communicate for the exchange of sensor data and planned trajectories. Autonomous driving sets string performance requirements (latency, reliability, capacity) for the 5G communication systems. For instance, less than 10 ms end-to-end latency and reliability higher than 99.99% are required to support a wide range of Vehicle-to-everything (V2X) use cases (e.g., cooperative collision avoidance, high density platooning, cooperative perception of self-driving vehicles).

The data traffic to be exchanged among the vehicles is expected to have in many cases localized significance (i.e. among devices located at the same geographical region). The formation of "local end-to-end (e2e)" radio data paths has been proposed to address the challenge of fast and guaranteed transmission of localized data traffic among the involved devices, satisfying the demanding Quality of Service (QoS) requirements and the features of the V2X services. The "end-to-end" term denotes that the (user plane) radio data paths are established among the involved communicating end devices (i.e., vehicles), while the "local" term denotes that the paths are established by (and via) the BSs (i.e. the nodes of the core network do not participate in the user plane transmissions), since the data traffic is localized.

As mentioned above, the establishment of "local e2e" paths with guaranteed e2e path performance facilitates the provision of V2X services that have demanding QoS requirements. However, the spatiotemporal dynamics of wireless networks and vehicles' high mobility are some of the factors that might affect the continuous provision of the Guaranteed QoS over the local e2e path. The continuous and guaranteed QoS provision is necessary for critical V2X services (e.g., platooning, cooperative collision avoidance) since this allows the smooth and safe behavior of vehicles.

SUMMARY

It is the object of the invention to provide efficient techniques for predicting changes of provided QoS (e.g., latency, data rate, reliability) in particular over the "local e2e" paths to reduce the impact of QoS change, especially for critical V2X services and thus to enhance safety.

This object is achieved by the features of the independent claims. Further implementation forms are apparent from the dependent claims, the description and the figures.

A basic idea of the invention is to enable the prediction and early notification of QoS change of a "local e2e" path, together with proactive re-configuration of the "local e2e" path.

The introduction of the concept of "local e2e" paths will be used for the provision of V2X services that have demanding performance requirements and localized traffic nature. The establishment of a local e2e path integrates uplink/downlink radio bearers and backhaul links among different BSs (e.g., gNBs). For establishing a "local e2e" paths, the application to QoS Flow mapping and the QoS Flow to DRB mapping needs to be jointly decided by all involved BSs (e.g., gNBs). The solution according to the disclosure introduces the concept of prediction of the QoS changes over a "local e2e" path.

The prediction of "local e2e" path quality (e.g., based on the mobility information of UEs (vehicles), the application behavior, map information and network information), the QoS Re-Negotiation of application (e.g., V2X application at the vehicle side) together with pro-active DRBs and "local e2e" path re-configuration, as well as the early notification of involved UEs/vehicles for the change of provided QoS are some of the features presented in this disclosure and which may be needed by specific future 5G services e.g., V2X safety and efficiency.

The solution presented in this disclosure describes a concept of predictive-QoS where the vehicles (V2X applications) will receive pro-actively information from the network when the connectivity parameters are going to change and this will allow them to make the appropriate adaptations at their side; thus, maintaining safety and efficiency of V2X services.

The disclosure presents techniques how to enable the pro-active adaptation of Radio Access Network (RAN) for Guaranteed-QoS e2e local path continuity, when predicting dynamic changes of RAN performance. The pro-active re-configuration (pro-active Access Stratum (AS) QoS control) will help to maintain the same guaranteed QoS by adapting the "local e2e" path before the RAN degradation happens. In case that the same guaranteed QoS cannot be supported, then the vehicles are notified early enough and are pro-actively adapted based on different (e.g., lower) QoS guarantees of the "local e2e" path.

This disclosure presents a concept for the exploitation of methods to predict the change of provided QoS (e.g., latency, data rate, reliability) over an established "local e2e" path in order to reduce the impact of QoS change for a group of vehicles, especially for critical V2X services.

The introduction of prediction capability for expected changes of QoS of a "local e2e" path increases the reliability of the system, allowing the V2X application to be notified (feedback) early enough for a needed modification of a bearer or for a new configuration. Periodic or event-triggered reporting by the vehicles is used together with network/radio information to assess current network conditions and predict any degradation (or upgrade) of provided QoS (e.g. change of RAN traffic or resources availability). An "early" notification scheme from the network (e.g., BSs) to a vehicle (or a group of them) about expected changes on supported QoS of already established "local e2e" paths facilitates the "early" modification of the (V2X) application layer. This allows the V2X application and the vehicles to modify smoothly and safely their driving behavior.

The following benefits are achieved by the concept described hereinafter: Increased reliability and availability of provided communication services via local e2e paths; reduced impact of QoS change especially for critical services; guaranteed e2e link quality (predictable/guaranteed delay, reliability, throughput) to V2V applications, which is the essential requirement for safety related V2V communications; continuous service provision by 5G communication system, reducing the service drop rate.

In the following, Radio Access Networks (RANs) and Data Radio Bearers (DRBs) are described with respect to Quality of Service (QoS) flows. Radio Access Network (RAN) for each User Equipment (UE) establishes one or more Data Radio Bearers (DRBs) per Packet Data Unit (PDU) Session. At the Application Server (AS)-level, the RAN associates Uplink (UL) and Downlink (DL) Quality of Service (QoS) Flows with DRBs. The DRB defines the packet treatment on the radio interface (Uu). A DRB serves packets with the same packet forwarding treatment. Separate DRBs may be established for QoS flows requiring different packet forwarding treatment according to 3GPP TR. 38.804, "Study on new radio access technology Radio interface protocol aspects", Rel. 14, V14.0.0, 2017-03-24. Based on the output of admission control the appropriate DRBs are established to make sure that the expected QoS will be achieved. The dynamic QoS modification in an established bearer is provided by the network via the "modify bearer context request" message according to 3GPP TS 36.331 V14.2.2 (2017-03), Evolved Universal Terrestrial Radio Access (E-UTRA); Radio Resource Control (RRC); Protocol specification (Release 14) and 3GPP TS 24.301, V14.4.0 (2017-06), Non-Access-Stratum (NAS) protocol for Evolved Packet System (EPS); Stage 3. But this function does not allow the application or the UE to be notified early enough about an expected QoS change and negotiate with the network or adapt the application layer configuration before the actual QoS modification. Hence, the feature of predictive QoS as described in this disclosure may be introduced to enable early notification and thus improve QoS modification and thereby security.

In order to describe the embodiments of the invention in detail, the following terms, abbreviations and notations will be used:
QoS: Quality of Service
V2X: Vehicle to everything
V2V: Vehicle to Vehicle
E2E: End-to-End
DL: Downlink
UL: Uplink
PDU: Packet Data Unit
RAN: Radio Access Network
DRB: Data Radio Bearer
AS: Access Stratum
LTE: Long Term Evolution
BS: Base Station, for example access nodes, evolved NodeBs (eNBs), gNBs,
NodeBs, master eNBs (MeNBs), secondary eNBs (SeNBs), remote radio heads and access points
UE: User Equipment
ITS: Information and Telecommunications System
MME: Mobility Management Entity
AF: Application Function
CN-F: Core Network Function According to a first aspect, the invention relates to a mobile device, in particular a vehicle, comprising: a transceiver, configured to receive from a network a notification of a predicted change of a Quality-of-Service, QoS related to a local end-to-end data communication path; and a processor configured to trigger and/or apply the change of QoS of the local end-to-end data communication path.

Such a mobile device provides an efficient technique for predicting changes of provided QoS (e.g., latency, data rate, reliability) in particular over the "local e2e" paths to reduce the impact of QoS change, especially for critical V2X services and thus to enhance security. The mobile device enables prediction and early notification of QoS change of a "local e2e" path, together with proactive re-configuration of the "local e2e" path. This results in faster reaction and thus improved security.

In an exemplary implementation form of the mobile device, the notification is received upon request of the mobile device or automatically from the network.

This provides the advantage that the notification can be flexibly provided depending on the system configuration.

In an exemplary implementation form of the mobile device, the local end-to-end data communication path comprises radio data paths for transmission, in particular user plane or control plane transmission, among the two mobile devices established via one or more base stations serving the two mobile devices, in particular without participation of core network nodes in the user plane transmission.

This provides the advantage that the local end-to-end data path can be flexibly established at a reduced latency for message transmission. Hence, communication is fast and safe.

In an exemplary implementation form of the mobile device, the change of the QoS is based on one or more of the following parameters of the local end-to-end data communication path: latency, data rate, reliability, packet-loss, coverage level, jitter.

This provides the advantage that the QoS can cover a lot of traffic situations in the communication network.

In an exemplary implementation form of the mobile device, the processor is configured to transmit a report to the network, the report comprising at least one of the following information: location information, application layer information, mobile device status information, experienced QoS at mobile device side, radio channel conditions.

This provides the advantage that the network obtains all necessary information for improving or optimizing the network conditions.

In an exemplary implementation form of the mobile device, the notification from the network comprises at least one of the following: notification about new QoS choices based on prediction, notification that a current QoS for the local end-to-end data communication path cannot be supported, notification that the current QoS can be fulfilled by a modification of the QoS of one or more local links of the local end-to-end data communication path.

This provides the advantage that the mobile device can proactively adjust its communication behavior depending on the notification received from the network.

In an exemplary implementation form of the mobile device, the processor is configured to respond to a notification from the network about an estimated and/or expected change of the QoS related to the local end-to-end data communication path in order to enable the mobile device to accept or decline the change.

This provides the advantage that the mobile device can influence the network conditions by its response.

In an exemplary implementation form of the mobile device, the processor is configured to predict a change of the QoS of the local end-to-end data communication path based on a change of conditions at the mobile device and to request the network to reconfigure the local end-to-end data communication path based on the predicted QoS change.

This provides the advantage that the mobile device can influence the network modifying the local end-to-end data communication path in order to improve safety.

According to a second aspect, the invention relates to a network device, in particular a base station or a mobility management entity, comprising: a radio interface, configured to transceive communication data via a communication path, in particular a local end-to-end data communication path between a mobile device and another mobile device, based on a Quality-of-Service, QoS, requirement for the communication path; and a network entity controller, configured to predict the change of QoS and notify the mobile device about the predicted change of the QoS related to the communication path.

Such a network device provides an efficient technique for predicting changes of provided QoS (e.g., latency, data rate, reliability) in particular over the "local e2e" paths to reduce the impact of QoS change, especially for critical V2X services and thus to enhance security. The network device enables prediction and early notification of QoS change of a "local e2e" path, together with proactive re-configuration of the "local e2e" path. This results in faster reaction and thus improved security.

In an exemplary implementation form of the network device, the network entity controller is configured to notify an application server about the predicted change of the QoS of the communication path.

This provides the advantage that the application server, that is responsible for the assessment of the impact that the QoS change of the communication layer will have on the behavior of the supported application, will receive the necessary information for decision.

In an exemplary implementation form of the network device, the network entity controller is configured to predict the change of QoS.

This provides the advantage that by predicting the change of QoS the network device can proactively react before a change has happened or inform the related entities about the change of QoS.

In an exemplary implementation form of the network device, the notification comprises at least one of the following: notification about new QoS choices based on prediction, notification that a current QoS of the local end-to-end data communication path cannot be supported, notification that the current QoS can be maintained by a reconfiguration of the QoS of one or more local links of the local end-to-end data communication path; and the network entity controller is configured to transmit the notification to network entities that form the communication path, in particular the local end-to-end data communication path, and to apply the change of the QoS based on a response from the network entities that form the communication path.

This provides the advantage that various scenarios as described above can be implemented. Hence the network device supports a variety of communication scenarios.

In an exemplary implementation form, the network device is configured to coordinate the network entities that form the communication path to select an appropriate configuration of the local end-to-end data communication path for the changed QoS or to maintain the current QoS based on the received notification.

This provides the advantage that network entities that form the communication path can be optimally controlled in order to form a low-latency communication path and hence to improve safety.

In an exemplary implementation form of the network device, the communication path comprises radio data paths for transmission, in particular user plane or control plane transmission, among two or more mobile devices established via one or more base station, in particular without participation of core network nodes in the user plane transmission.

This provides the advantage that the local end-to-end data path can be flexibly established at a reduced latency for message transmission. Hence, communication is fast and safe.

In an exemplary implementation form of the network device, the network entity controller is configured to transmit the notification about an estimated or expected change of the QoS upon request of the mobile device or automatically.

This provides the advantage that the notification can be flexibly provided depending on the system configuration.

In an exemplary implementation form of the network device, a change of the QoS requirement is based on one or more of the following parameters of the communication path: latency, data rate, reliability, packet-loss, coverage level, jitter.

This provides the advantage that the QoS can cover a lot of traffic situations in the communication network.

In an exemplary implementation form of the network device, the network entity controller is configured to: receive a request for activation of a prediction service for predicting a change of the QoS over a local end-to-end data communication path; and decide whether to accept the request, reject the request or provide an alternative forecast period.

This provides the advantage that the network device can flexibly decide which actions to take in order to improve communication.

In an exemplary implementation form of the network device, the network entity controller is configured: in case of acceptance: to configure a reporting periodicity to enable the prediction, in case of rejection: provide a reason for the rejection and/or an provide alternative forecast period.

This provides the advantage that the network provides the necessary information for operating the mobile devices and the end-to-end communication path.

In an exemplary implementation form, the network device comprises: a processor, configured to run a prediction service, wherein the prediction service is configured to enable the network entity controller to notify the mobile device about the estimated and/or expected change of the QoS related to the communication path.

This provides the advantage that the mobile device receives all necessary information for deciding whether to change or keep an established communication path.

In an exemplary implementation form of the network device, the prediction service is initiated automatically or periodically or event-driven, in particular upon request of the mobile device.

This provides the advantage that the prediction service can be flexibly installed.

In an exemplary implementation form of the network device, the prediction service is configured to enable a prediction of the QoS related to the communication path based on mobility information and/or application behavior of one or more mobile devices, map information and/or network information.

This provides the advantage that the prediction can be based on a large database resulting in accurate prediction.

In an exemplary implementation form of the network device, the prediction of the QoS related to the communication path is based on a reporting period in which the network device receives reports from the mobile devices and other network devices, in particular base stations that establish the local end-to-end data communication path.

This provides the advantage that based on these reports the prediction can be precisely computed.

In an exemplary implementation form of the network device, the reports from the mobile devices comprise at least one of the following information: location information, application layer information, mobile device status information, experienced QoS at mobile device side, radio channel conditions; and the reports from the base stations comprise at least one of the following information: scheduling information, backhaul link information, experienced QoS, communication QoS of inter base station links.

This provides the advantage that including such a lot of information improves the prediction.

In an exemplary implementation form of the network device, the prediction service is centrally provided by a dedicated network entity, hierarchically provided by the dedicated network entity which is supported by local base station entities; or provided in a distributed mode by the local base station entities.

This provides the advantage that the prediction service can be flexibly implemented in the network.

In an exemplary implementation form of the network device, the prediction service is provided based on a prediction function that determines a prediction about an expected QoS of the communication path based on information collected from the mobile devices and/or base stations establishing the communication path.

This provides the advantage that the prediction service can be easily provided by calling the prediction function.

In an exemplary implementation form of the network device, the network entity controller is configured to notify the mobile device about an estimated or expected change of the QoS related to the communication path.

This provides the advantage that the mobile device can quickly react on QoS changes in the network in order to improve safety of communication.

In an exemplary implementation form of the network device, the network entity controller is configured to notify an application server about an estimated and/or expected change of the QoS related to the communication path.

This provides the advantage that the application server, that is responsible for the assessment of the impact that the QoS change of the communication layer will have on the behavior of the supported application, will receive the necessary information for decision.

According to a third aspect, the invention relates to a method for notifying an estimated and/or expected change of QoS related to a communication path, the method comprising: transceiving communication data via a communication path, in particular a local end-to-end data communication path between a mobile device and another mobile device, based on a Quality-of-Service, QoS, requirement related to the communication path; and receiving, from a network, notification of an estimated or expected change of the QoS related to the communication path.

Such a method provides an efficient technique for predicting changes of provided QoS (e.g., latency, data rate, reliability) in particular over the "local e2e" paths to reduce the impact of QoS change, especially for critical V2X services and thus to enhance security. The method enables prediction and early notification of QoS change of a "local e2e" path, together with proactive re-configuration of the "local e2e" path. This results in faster reaction and thus improved security and safety.

In the following, relevant aspects of the invention are highlighted:

Message from the vehicle to enable the Prediction Service at the Network for the QoS of the local e2e path by specifying the forecast period.

Signaling by the network to configure the reporting period that is needed to support the prediction function.

Reporting of application layer information (e.g., Location, short term path, speed, ...) and radio information (QoS, radio conditions) from the vehicles to the BSs (e.g., gNBs) or other Core Network Control Plane (CN-C) entities (e.g., MME, AMF) to support the calculation of predicted (expected) change of QoS metrics (e.g., expected data rate, latency, reliability).

Reporting from the BSs (e.g., gNBs) to CN-C entities (e.g., MME, AMF) or neighboring BSs (e.g., gNBs) of Scheduling info (available resources, reserved resources ...), backhaul status and/or Xn information (delay, data rate, ...) to be used for the prediction of the QoS of local e2e path.

Transmission from the BSs (e.g., gNBs) to CN-C entities (e.g., MME, AMF) or neighboring BSs (e.g., gNBs) of the outcomes of local QoS prediction for part/link of the local e2e paths (Useful especially for the case of Hierarchical or Distributed Prediction Schemes).

Notification of Prediction's outcome from CN-C entity (e.g., MME, AMF) to BSs (e.g., gNBs) in case that a QoS change has been predicted. The notification can include. New QoS proposal for local e2e path; Not Feasible current QoS of local e2e path; New QoS for a part/link of the e2e path to maintain the current QoS of local e2e path.

Signaling among BSs e.g., gNBs (distributed mode) or between network entities (e.g., MME/AMF) and BSs e.g., gNBs (Centralized mode) to coordinate and agree on the reconfiguration of the local e2e path (e.g., Re-Negotiation of QoS class, DRBs configuration, QoS flow to DRB mapping) to support a different QoS, based on the outcome of prediction scheme.

The MME/AMF (in case of a centralized scheme), according to the prediction outcome and evaluating the configurations proposed by involved BSs, replies a) with an ACK to the proposed configurations, b) Reject, c) Propose alternative configuration.

Signaling for notification from the network to the vehicles about predicted QoS change and re-negotiation between the network and the vehicles for updated local e2e path Quality.

Signaling for notification and re-negotiation between the network and an ITS Application Server about predicted QoS change and updated local e2e path Quality.

Predictive QoS adaptation trigger at the mobile terminal/vehicle (e.g. change of vehicle conditions) and notification of the network (e.g., gNB, MME/AMF) to trigger the adaptation of local e2e path.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may also be implemented in wireless communication networks based on mobile communication standards similar to, e.g., LTE, in particular 4.5G, 5G and beyond. The methods and devices described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz.

The devices and systems described herein may include processors, memories and transceivers, i.e. transmitters and/or receivers. In the following description, the term "processor" describes any device that can be utilized for processing specific tasks (or blocks or steps). A processor can be a single processor or a multi-core processor or can include a set of processors or can include means for processing. A processor can process software or firmware or applications etc.

In the following, base stations and User Equipments are described. Examples of a base station may include access nodes, evolved NodeBs (eNBs), gNBs, NodeBs, master eNBs (MeNBs), secondary eNBs (SeNBs), remote radio heads and access points.

Figure 1:
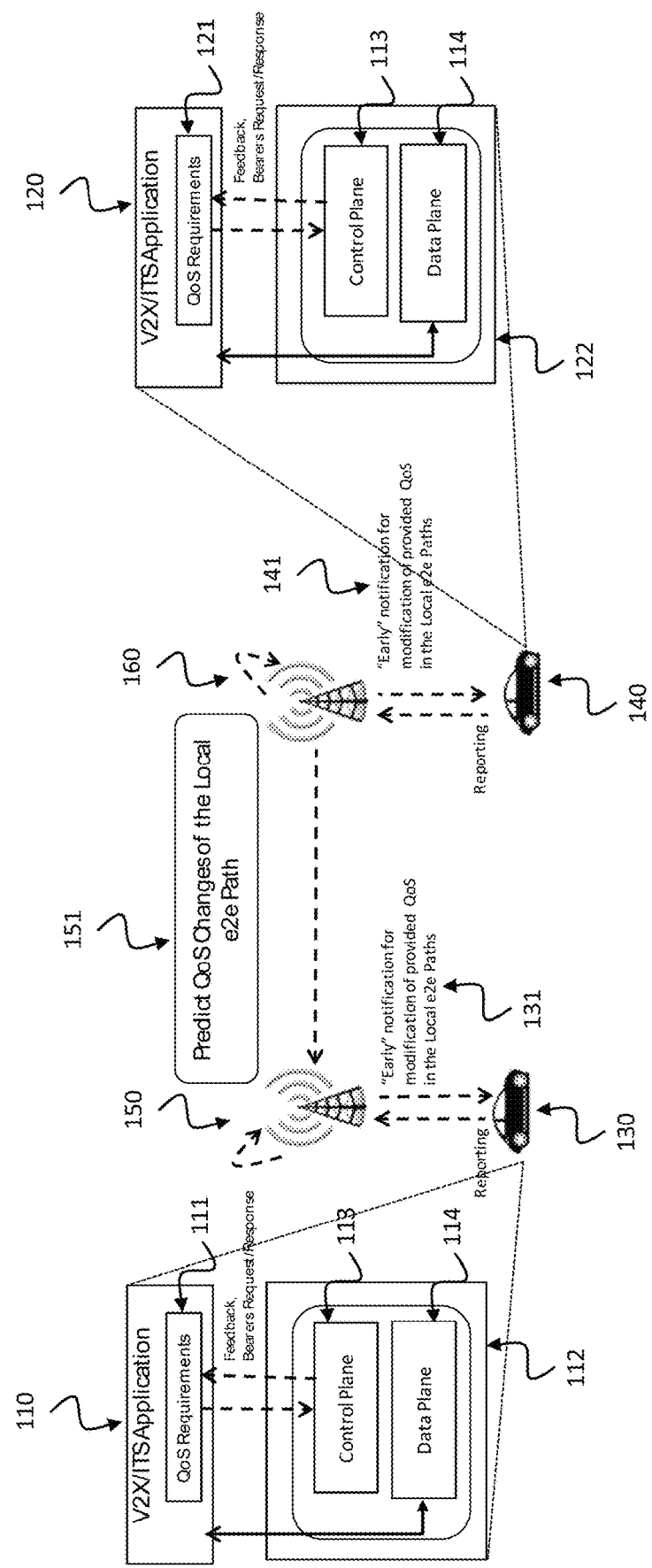
FIG. 1 shows a schematic diagram illustrating an overview of interactions 100 of RAN nodes to support predictive QoS of "local e2e" path according to the disclosure.

FIG. 1 shows a schematic diagram illustrating an overview of exemplary interactions 100 of RAN nodes to support predictive QoS of "local e2e" path according to the disclosure. UEs (Vehicles) 130, 140 are configured to request the network to enable the prediction service for the QoS change of a local e2e path. The vehicles 130, 140 and network entities (e.g., BSs 150, 160 that form that local e2e path) are configured to report information (application layer, network layer about resource availability and configurability (from air-interface & backhaul)) to the QoS Prediction function 151 placed at the network used for the prediction of the QoS change of a local e2e path. The QoS Prediction function 151 notifies the network entities (e.g., BSs 150, 160) that form the local e2e path (e.g., BSs 150, 160) about the outcome of the prediction function 151. In the case that a QoS change has been predicted, the BSs 150, 160 that form the local e2e path undertake to coordinate to jointly reconfigure the "local e2e" path, based on an updated supported QoS; hence, enabling the pro-active adaptation of link/bearers of the "local e2e" path. The network notifies 131, 141 the UEs (Vehicles) 130, 140 that are served by the "local e2e" path about the expected QoS change and the updated supported QoS. The "local e2e" path is reconfigured only after the acceptance by the involved UEs 130, 140. Otherwise, a re-negotiation between the network and the vehicles takes place for an agreement on the appropriate QoS.

FIG. 1 provides an overview of involved entities and interactions of RAN nodes to support Predictive QoS of "local e2e" path. In this example, the "local e2e" path includes UEs 130, 140 and BSs 150, 160. UE1 130 runs a V2X/ITS application module 110 including QoS requirements 111 of UE1 130 and a communication module 112 including control plane 113 and data plane 114. UE2 140 runs a V2X/ITS application module 120 including QoS requirements 121 of UE2 140 and a communication module 122 including control plane 113 and data plane 114. V2X/ITS application 110 running on vehicle 130 performs bearers request/response via control plane 113 according to QoS requirements 111 and data transmit/receive via data plane 114. V2X/ITS application 120 running on vehicle 140 performs bearers request/response via control plane 113 according to QoS requirements 121 and data transmit/receive via data plane 114.

Figure 2:
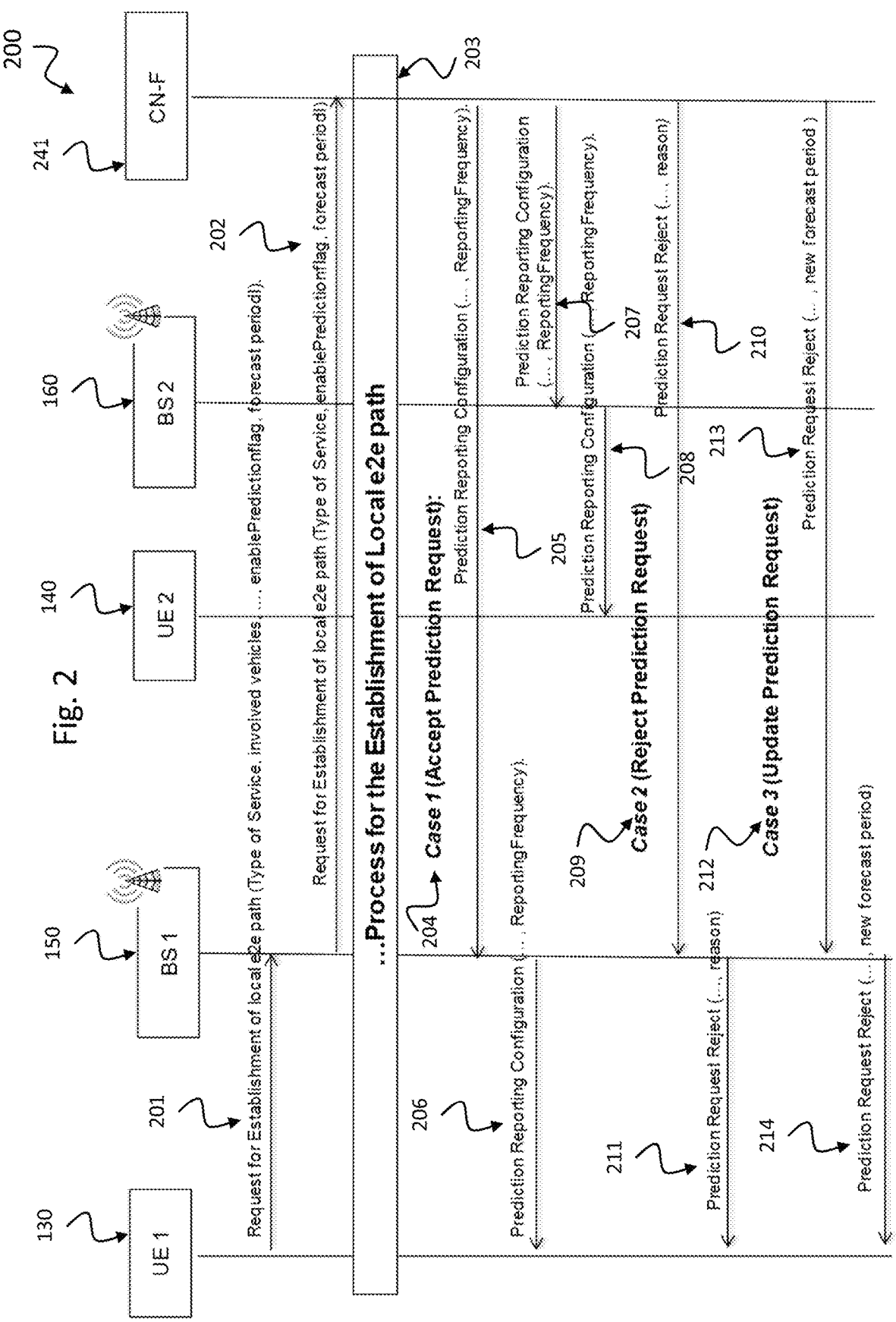
FIG. 2 shows a schematic diagram illustrating a message sequence chart 200 for enabling/requesting prediction service of "local e2e" path quality according to the disclosure.

FIG. 2 shows a schematic diagram illustrating an exemplary message sequence chart 200 for enabling/requesting prediction service of "local e2e" path quality according to the disclosure.

The UE 130 (e.g., vehicle) requests 201 the network for the activation of the prediction service for the QoS that is provided over the local e2e path for one or more V2X services. In the request message 201 the initiating UE 130 includes information about the type of service, the involved vehicles, and the proposed forecast interval for the specific V2X Service. The forecast (or prediction) interval denotes the period of time for which the expected QoS will be provided by the network (e.g., a QoS of 10 ms e2e latency and 99.99% reliability will be provided by the network for the next 2 seconds with a 95% confidence interval). The forecast interval affects may affect the measurement/reporting periods as well as the selected prediction schemes. Different types of services or different road environments may have different forecast intervals. For instance, in a urban environment a future time-frame of e.g., three seconds is required for a specific V2X service, while in a highway scenario the expected forecast interval may be larger e.g., six seconds.

The request to enable the prediction service may be included in the request message 201 to establish the local e2e path (in this case a flag to indicate the activation of the prediction service is needed) or it may be sent with an individual dedicated message.

The network receives the request for the activation of the prediction service over a local e2e path and according to the existing conditions can decide to accept the request, to reject the request or propose an alternative forecast period. In the case that the prediction request is accepted, the reporting periodicity to enable the prediction is configured by the network. In the case of rejection the reason can provided, while with the "Update Prediction Request" message an alternative forecast period can be proposed by the network.

The request 201 to enable prediction of local e2e path may be sent to RAN (e.g., BS 150) or core network entities. FIG. 2 presents an implementation example, where a Core Network Function (CN-F) entity 241 is used (e.g., Mobility Management Entity (MME) in LTE or Access and Mobility Function (AMF) in 5G) to receive the prediction request 201, 202 as well as to provide the corresponding response.

After receiving the prediction request 201, 202, the process for the establishment of local e2e path 203 is started. Three cases are described in the following. According to a first case 204, where prediction request is accepted, CN-F 241 reports 205, 207 prediction configuration to BS1 150 and BS2 160 which forward 206, 208 prediction reporting configuration to UE1 130 and UE2 respectively. According to a second case 209, where prediction request is rejected, CN-F 241 reports 210 prediction request reject to BS1 150 which forwards 211 prediction request reject to UE1 130. According to a third case 212, where prediction request is updated, CN-F 241 reports 213 prediction request reject with new forecast period to BS1 150 which forwards 214 prediction request reject with new forecast period to UE1 130.

Alternatively, the "Prediction Reporting Configuration" can be also decided at the BS 150 directly.

In another embodiment, after a device is attached to a network, the prediction service is a "default" service based on the subscription information. In this case, after a device sends services request, such prediction service is enabled by default.

Figure 3:
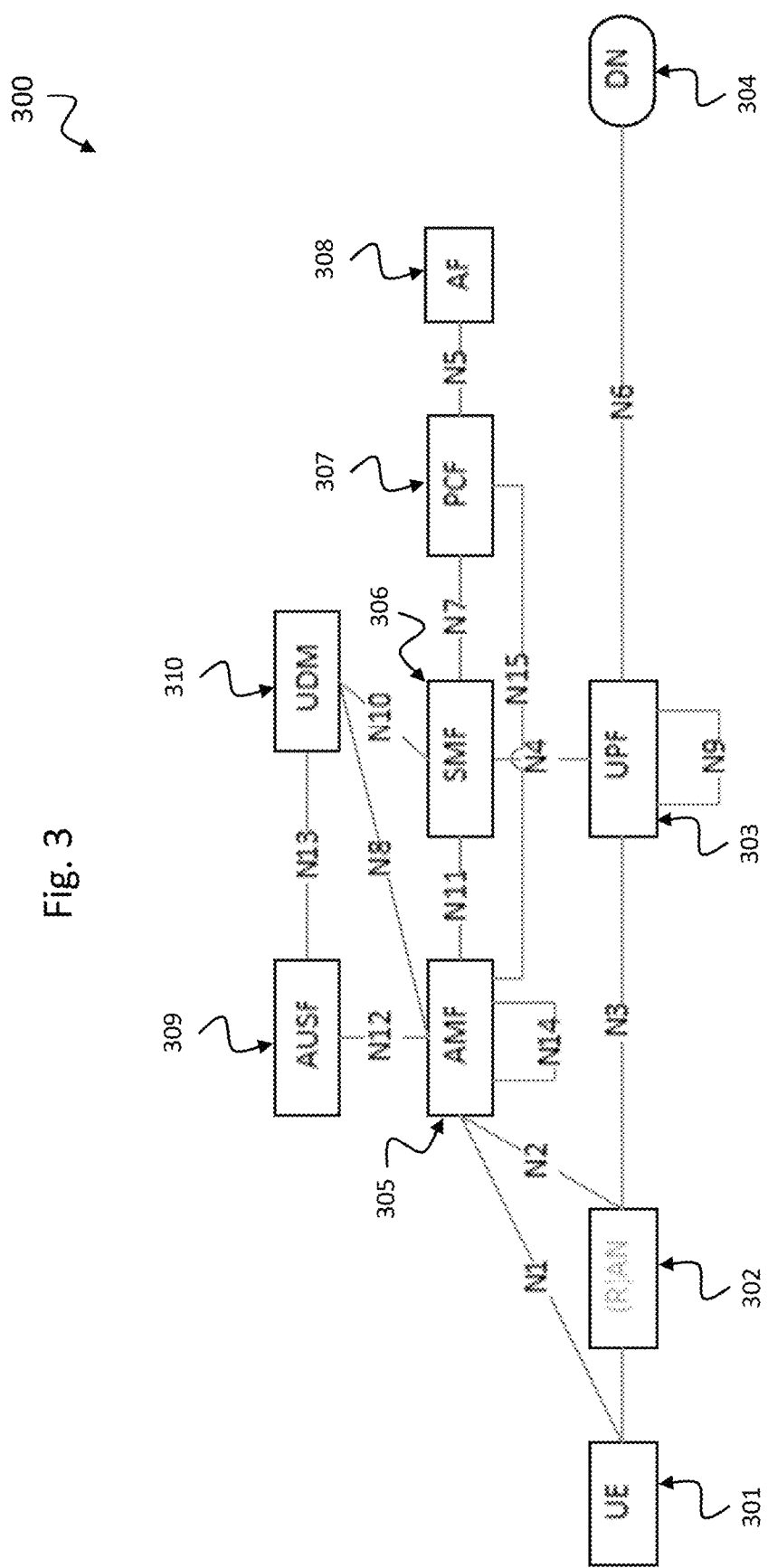
FIG. 3 shows a block diagram illustrating an exemplary structure 300 for an application function (AF) according to the 3GPP 5G Reference Architecture (SA2)

FIG. 3 shows a block diagram illustrating an exemplary structure 300 for an application function (AF) according to the 3GPP 5G Reference Architecture (SA2).

As an alternative embodiment, the request to enable the Prediction Service of the QoS of a "local e2e" path may be sent by an Application Server that controls and coordinates a specific V2X Service. In this case, the V2X/ITS Application Server can send the request to enable the Prediction Service to a CN-F. In 5G networks, for instance, the Application Server may send the request to the Application Function (AF) 308; the latter forwards the request to the PCF entity 307 via N5 interface and then to the AMF 305 (via the N15 interface) (see FIG. 3). The AF 308 and Application Server may be collocated. At another implementation the AF 308 may send directly the request to the AMF function 305.

Figure 4:
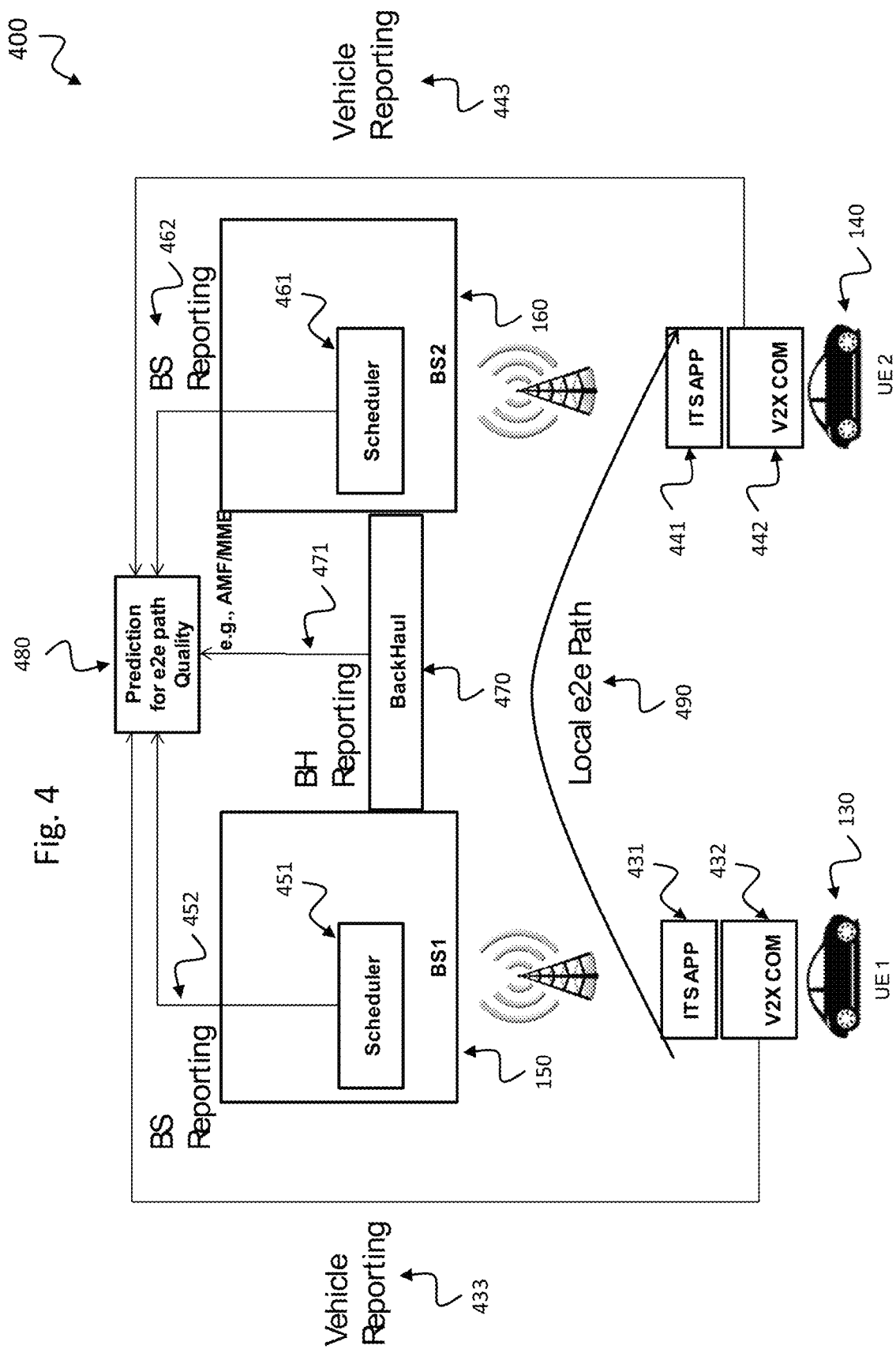
FIG. 4 shows a schematic diagram illustrating an example scheme 400 for prediction of "local e2e" path quality in a centralized mode according to the disclosure.
Figure 5:
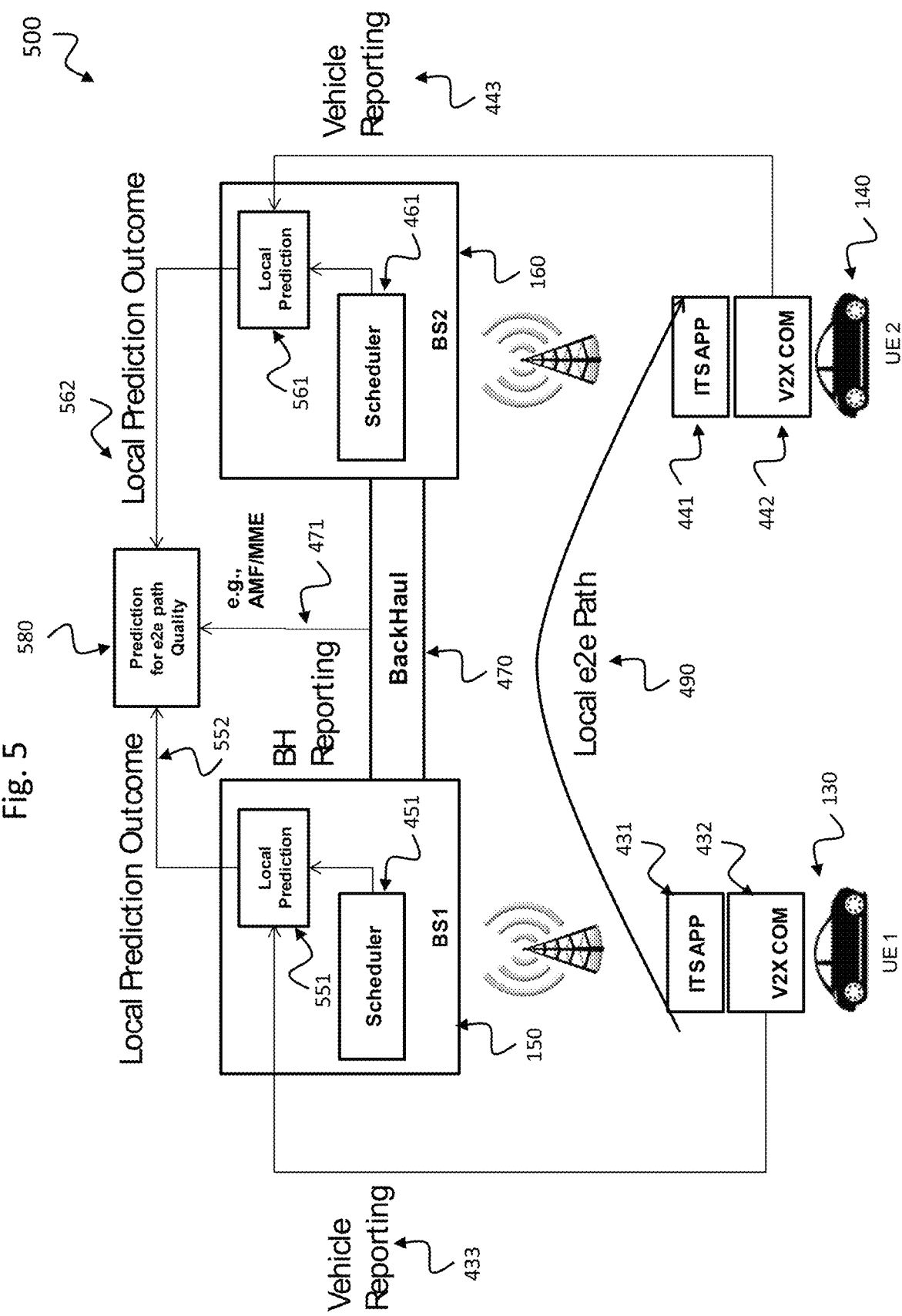
FIG. 5 shows a schematic diagram illustrating an example scheme 500 for prediction of "local e2e" path quality in a hierarchical mode according to the disclosure.
Figure 6:
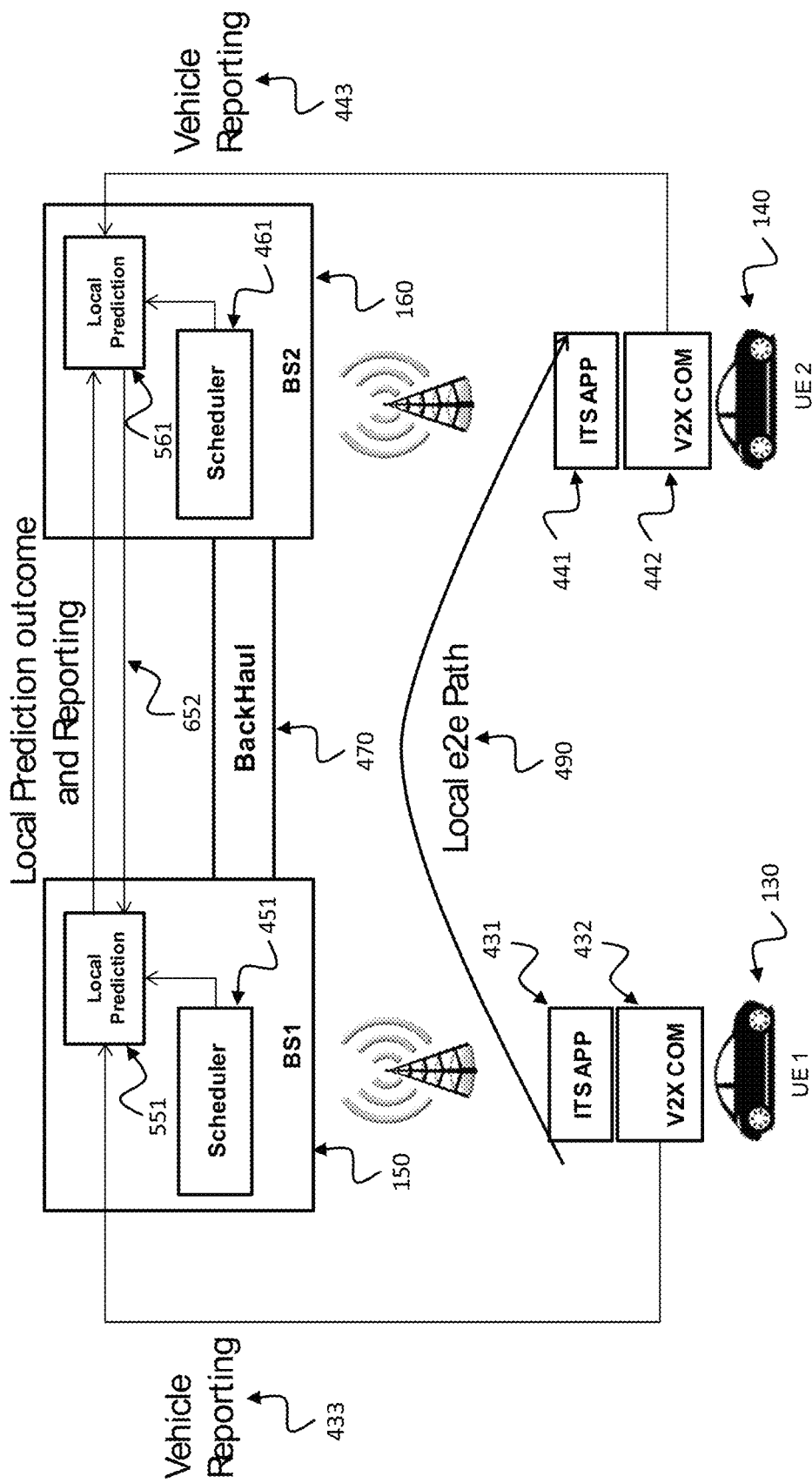
FIG. 6 shows a schematic diagram illustrating an example scheme 600 for prediction of "local e2e" path quality in a distributed mode according to the disclosure.

The Prediction function and the coordination among involved entities to agree on the updated "local e2e" path can take place using a centralized scheme as shown in FIG. 4, or a hierarchical scheme as shown in FIG. 5, or a distributed scheme as shown in FIG. 6.

FIG. 4 shows a schematic diagram illustrating an example scheme 400 for prediction of "local e2e" path quality in a centralized mode according to the disclosure. FIG. 4 presents an example implementation where the prediction function 480 is centralized and located at the CN-F (e.g., MME (LTE) or AMF (5G)). Alternatively, the (centralized) prediction function 480 can be implemented in RAN (e.g. gNB 150, 160).

A communication module 432 of UE1 130 (that may correspond to communication module 112 depicted in FIG. 1) communicates with the centralized prediction function 480 for e2e path quality by transmitting vehicle reporting 433. A communication module 442 of UE2 140 (that may correspond to communication module 122 depicted in FIG. 1) communicates with the centralized prediction function 480 for e2e path quality by transmitting vehicle reporting 443. A scheduler 451 of BS1 150 communicates with the centralized prediction function 480 for e2e path quality by transmitting BS reporting 452. A scheduler 461 of BS2 160 communicates with the centralized prediction function 480 for e2e path quality by transmitting BS reporting 462. A Backhaul (BH) module 470 between BS1 150 and BS2 160 communicates with the centralized prediction function 480 for e2e path quality by transmitting BH reporting 471. An application module 431 of UE1 130 (that may correspond to application module 110 depicted in FIG. 1) communicates with an application module 441 of UE2 140 (that may correspond to application module 120 depicted in FIG. 1) to establish a local e2e path 490 between UE1 130 and UE2 140. The local e2e path 490 may be established based on the predicted e2e path quality determined by the central module 480.

FIG. 5 shows a schematic diagram illustrating an example scheme 500 for prediction of "local e2e" path quality in a hierarchical mode according to the disclosure.

In the Hierarchical scheme (FIG. 5), a part of the QoS prediction takes place at the BSs 150, 160 (e.g., for the QoS of links of the corresponding BS) noted as local prediction module 551, 561 and the e2e prediction (e.g., including QoS of backhaul and all involved BS) takes place at another entity 580 where individual predictions 552, 562 are collected (e.g., AMF). The benefit of a hierarchical scheme is the reduction of reporting signaling from all involved entities to a centralized entity.

The communication module 432 of UE1 130 (that may correspond to communication module 112 depicted in FIG. 1) communicates with the local prediction module 551 included in BS1 150 by transmitting vehicle reporting 433. The communication module 442 of UE2 140 (that may correspond to communication module 122 depicted in FIG. 1) communicates with the local prediction module 561 included in BS2 160 by transmitting vehicle reporting 443. The scheduler 451 of BS1 150 communicates with the local prediction module 551 which transmits local prediction outcome 552 to a centralized prediction function 580 for e2e path quality. The scheduler 461 of BS2 160 communicates with the local prediction module 561 which transmits local prediction outcome 562 to the centralized prediction function 580 for e2e path quality. The Backhaul (BH) module 470 between BS1 150 and BS2 160 communicates with the centralized prediction function 580 for e2e path quality by transmitting BH reporting 471. The application module 431 of UE1 130 (that may correspond to application module 110 depicted in FIG. 1) communicates with the application module 441 of UE2 140 (that may correspond to application module 120 depicted in FIG. 1) to establish the local e2e path 490 between UE1 130 and UE2 140. The local e2e path 490 may be established based on the predicted e2e path quality determined by the central module 580.

FIG. 6 shows a schematic diagram illustrating an example scheme 600 for prediction of "local e2e" path quality in a distributed mode according to the disclosure.

In the Distributed Scheme (FIG. 6), each entity is responsible to predict the QoS of a specific part/link of the "local e2e" path 490. In the case of a local prediction 551, 561 of a change of QoS, the BS (e.g. 150) notifies 652 the neighboring BSs/entities (e.g. 160) involved in the "local e2e" path 490 about the outcome and initiates the update/reconfiguration of local e2e path 490. There is no other central or higher entity that collects various local prediction outcomes to build the "local e2e" path prediction. Apart from the outcomes of the prediction, the BSs also exchange (periodically or not) information necessary for the local prediction (e.g., BH info 470).

Figure 7:
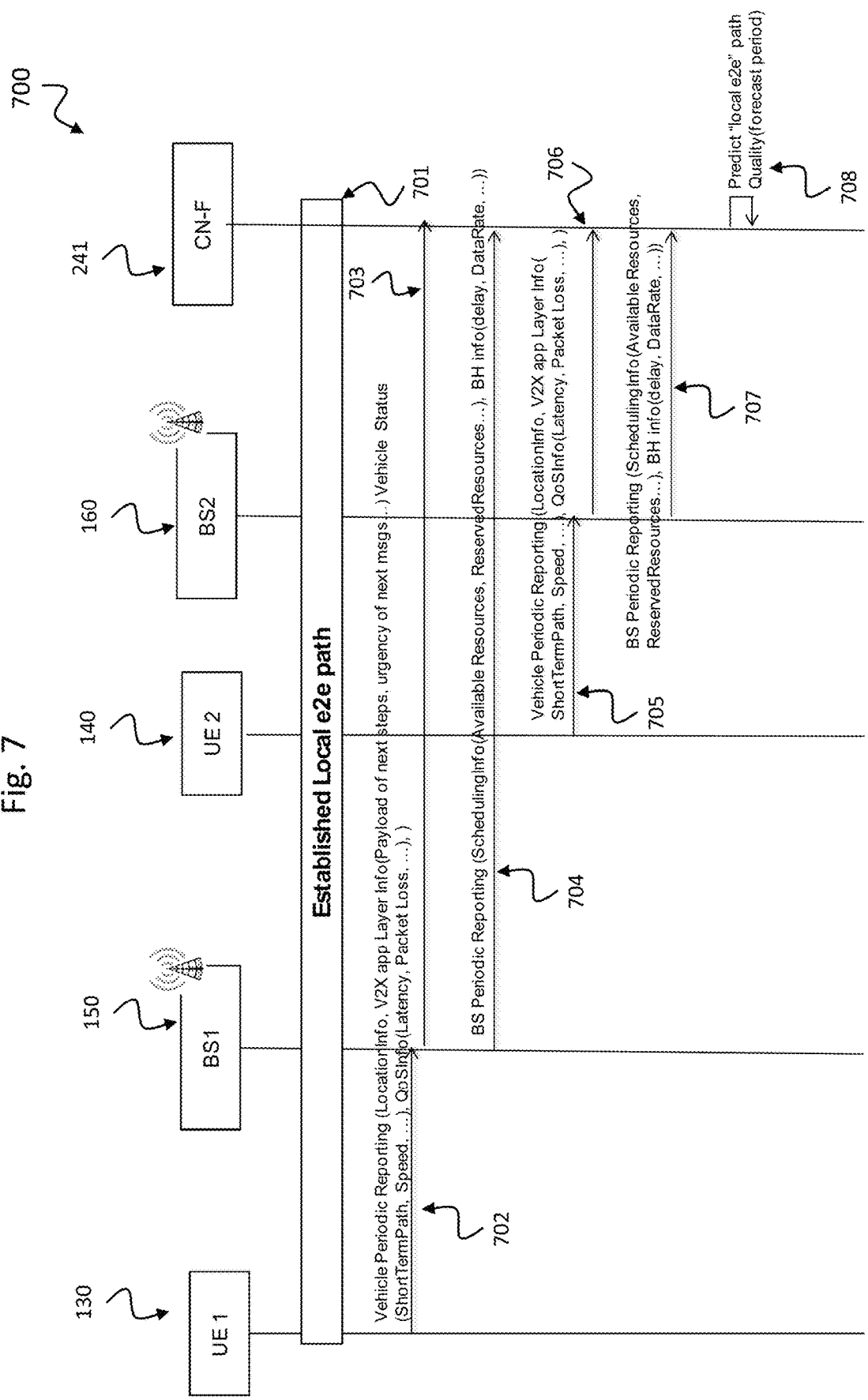
FIG. 7 shows a schematic diagram illustrating a message sequence chart 700 for reporting of required information for "local e2e" path QoS prediction (network-based) according to the disclosure.

FIG. 7 shows a schematic diagram illustrating a message sequence chart 700 for reporting of required information for "local e2e" path QoS prediction (network-based) according to the disclosure.

FIG. 7 describes the signaling for reporting of required information for "local e2e" path QoS Prediction (Centralized, Network-based). Periodic reporting from different sources is needed by the prediction function for the calculation of predicted (expected) change of QoS metrics (e.g., expected data rate, latency, reliability). Specifically, the prediction function 241 (e.g. 480 in FIG. 4, 551, 561, 580 in FIG. 5 or 551, 561 in FIG. 6) receives from the involved UEs 130, 140 periodic reporting messages 702, 703, 705, 706 that include, but not limited to the following information:

Location Information

Application Layer Information (e.g., payload of messages of next steps, urgency of next messages . . . )

UE Status (e.g., short-term trajectory path, speed, . . . )

Experience QoS at the UE side (e.g., latency, packet Loss, . . . )

Radio Channel conditions.

The Base Stations 150, 160 send periodically to the prediction function 241 information 704, 707 that includes but is not limited to the following fields:

Scheduling Information (available resources, reserved resources . . . )

Backhaul (BH) link information (e.g., delay, data rate . . . ).

Any of the above reporting messages can be also sent in a non-periodic manner, for instance it may be event triggered (e.g., when there is a change of road or radio conditions).

Figure 8:
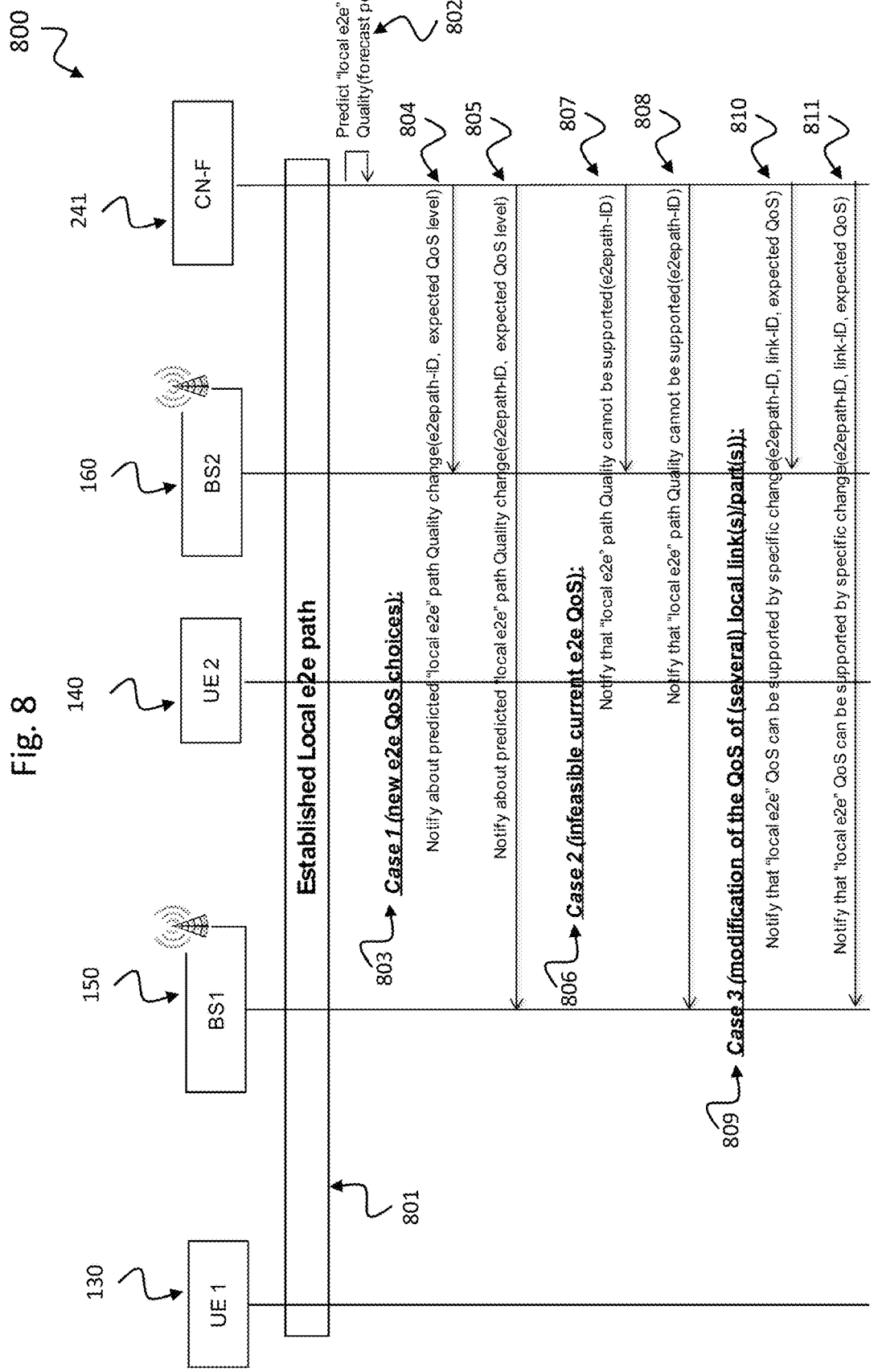
FIG. 8 shows a schematic diagram illustrating a message sequence chart 800 for notification of prediction outcome for "local e2e" path QoS (network-based) according to the disclosure.

FIG. 8 shows a schematic diagram illustrating a message sequence chart 800 for notification of prediction outcome for "local e2e" path QoS (network-based) according to the disclosure. In FIG. 8 a local e2e path is established 801, e.g., the local e2e path 490 shown in FIGS. 4 to 6.

The prediction function 241, based on the information collected by different sources, makes predictions about the expected QoS of the local e2e path for a specific service. The different response messages of the prediction function, may be, for example, the following:

Notification 804, 805 about new QoS choices 803 that the specific local e2e path (described by an identifier) can support after the forecast period and which are proposed based on prediction.

Notification 807, 808 to adapt current QoS for the specific local e2e path (described by an identifier), e.g., due to infeasible current e2e QoS 806. The prediction informs that the current QoS cannot be supported after the forecast and leaves the decision for the new QoS or re-configuration to be decided by involved entities.

Notify 810, 811 that current e2e-QoS can be fulfilled by the modification of the QoS of (several) local link(s)/part(s) 809. A new QoS is proposed only for a part (or some parts) of the e2e path (described by the link identifier and the local e2e path identifier). This will help to maintain the current QoS of local/e2e path in total, by making specific updates of some parts of the path.

Figure 9:
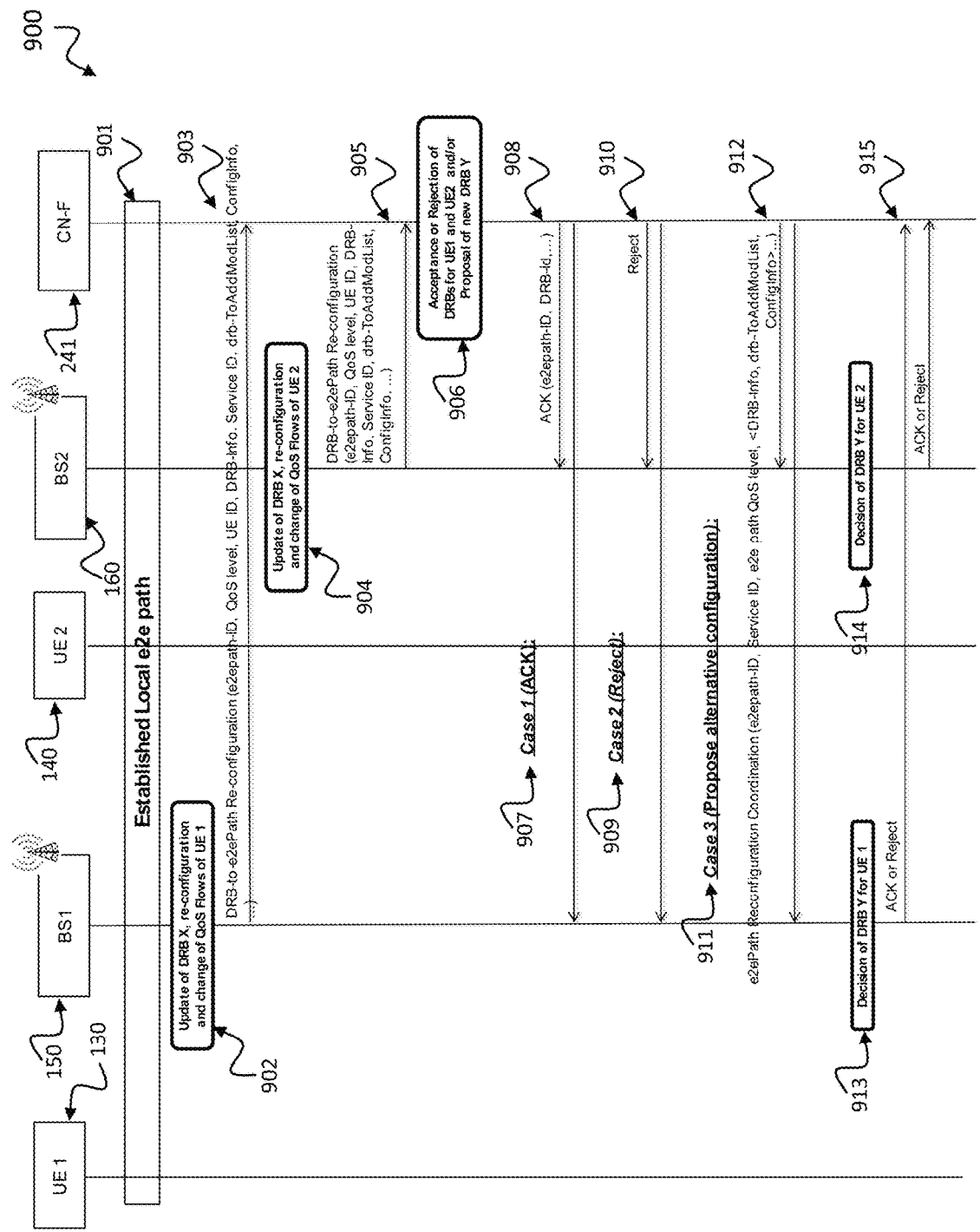
FIG. 9 shows a schematic diagram illustrating a message sequence chart 900 for coordination among network entities to reconfigure "local e2e" path according to the outcome of prediction (network-based, centralized mode) according to the disclosure.

The outcome of this phase triggers the coordination among involved entities (e.g., BS 150, 160) for the update of the already established "local e2e" path with different QoS features. FIG. 6 presents an implementation example, where the prediction function is placed at a CN-F entity 241 and the response is sent to the BSs 150, 160 that form the "local e2e" path. The Notification can be done in a periodic or non-periodic (event-driven) manner FIG. 9 shows a schematic diagram illustrating a message sequence chart 900 for coordination among network entities to reconfigure "local e2e" path according to the outcome of prediction (network-based, centralized mode) according to the disclosure. In FIG. 9 a local e2e path is established 901, e.g., the local e2e path 490 shown in FIGS. 4 to 6.

After the reception of the outcome of the prediction function 241, the network entities e.g., BS 140, 1 that form the "local e2e" path undertake to coordinate in order to agree on the reconfiguration 902 of the "local e2e" path according to the predictive QoS. The coordination can take place either in a distributed mode (as shown in FIG. 6) or with the support of central entity (as shown in FIGS. 4 and 5). FIG. 9 describes an implementation example, where the coordination is supported/controlled by a CN-F centralised entity 241 (e.g., MME, AMF) on an updated e2e path with different QoS. Each BS 150, 160, based on the outcome of prediction scheme undertakes to calculate the required update of the DRBs of the UEs 130, 140 that are attached to the specific BS, the required re-configuration of the wireless link and the change of QoS flows of involved UEs. Each BS provides to the centralized entity the proposed reconfiguration of the parts of the "local e2e" path that it controls (Message DRB-to-e2ePath Re-configuration 903, 905). This message 903, 905 includes the unique identifier of the e2e path, the IDs of the involved UEs 130, 140, the target QoS level, the selected DRB and the selected configuration of the links and radio bearers that are controlled by the specific BS 150, 160.

The CN-F 241 (centralised controller) collects the updated DRBs and configurations that different BSs have proposed and assess whether the "local e2e" QoS (latency, reliability, data rate . . . ) is satisfied taking into consideration the outcome of the prediction. The Mobility Management can make one of the following decides 907, 909, 911 and provide the corresponding responses to the BSs:

1) Accept the proposed configurations 908.
2) Reject the proposed configurations 910. Thereinafter, the involved entities/BSs can propose different configurations or the "local e2e" path can be released.
3) Propose to the BSs different configurations 912 and locally supported QoS levels. Then, the involved entities (BSs) can reply to the CN-F with an accept or reject message.

Figure 10:
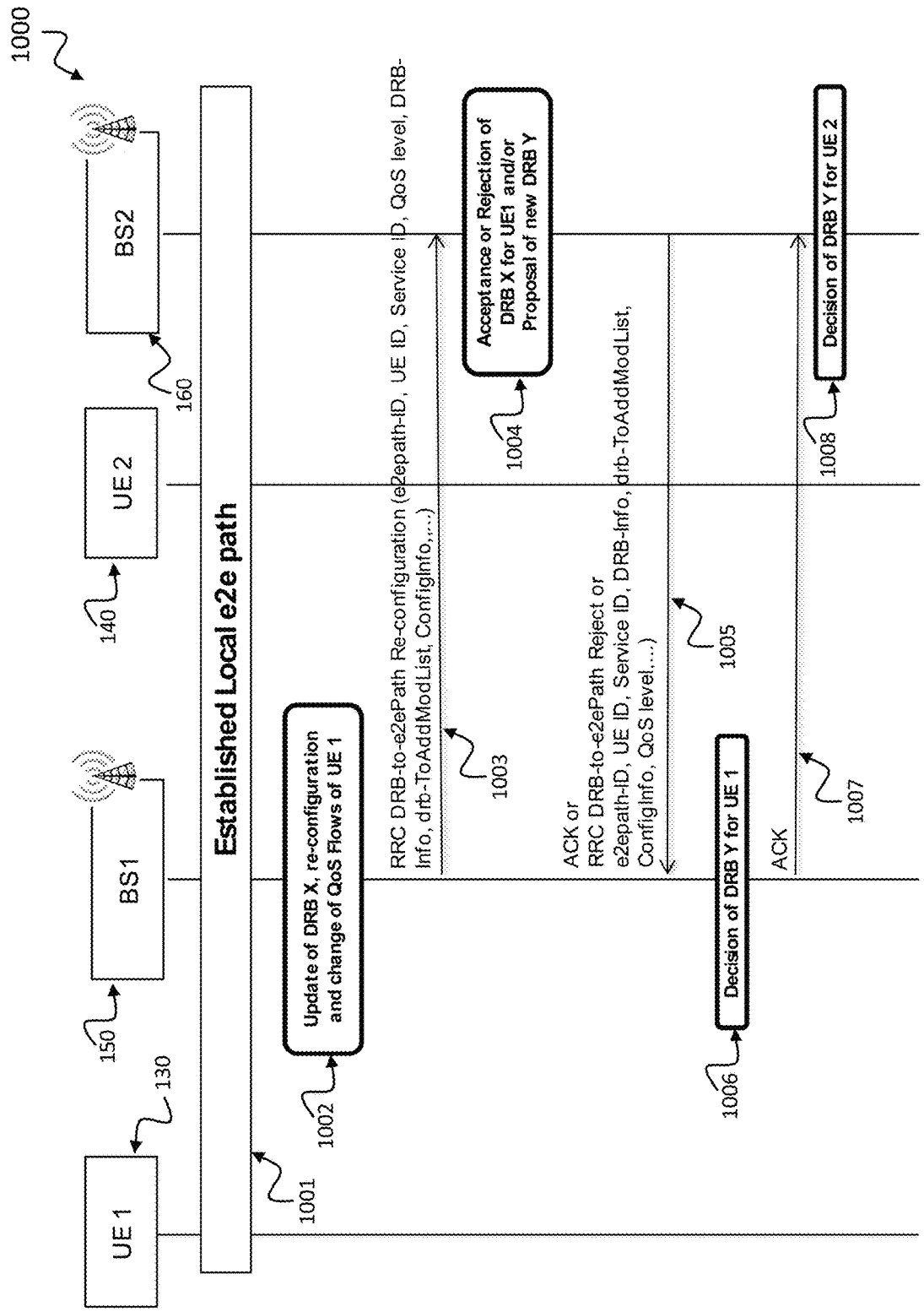
FIG. 10 shows a schematic diagram illustrating a message sequence chart 1000 for coordination among network entities to reconfigure "local e2e" path according to the outcome of prediction (network-based, distributed mode) according to the disclosure.

FIG. 10 shows a schematic diagram illustrating a message sequence chart 1000 for coordination among network entities to reconfigure "local e2e" path according to the outcome of prediction (network-based, distributed mode) according to the disclosure.

As mentioned above, the coordination and the agreement for the re-configuration of the "local e2e" path can be implemented in a distributed manner among the BSs 150, 160 without the existence of a central coordination point (FIG. 10). Based on the outcome of prediction scheme, an Inter BS coordination to agree on an updated e2e path with different QoS. Each BS (e.g. 150) provides to the neighboring BS (e.g. 160) that form together the "local e2e" path, the proposed reconfiguration of the parts of the "local e2e" path that it controls (Message DRB-to-e2ePath Re-configuration 1003). Then the neighboring BS 160 replies 1005 with accept (ACK), reject or another proposed configuration that will provide the predicted QoS. The neighboring BS 160 can have several iterations until they converge.

Figure 11:
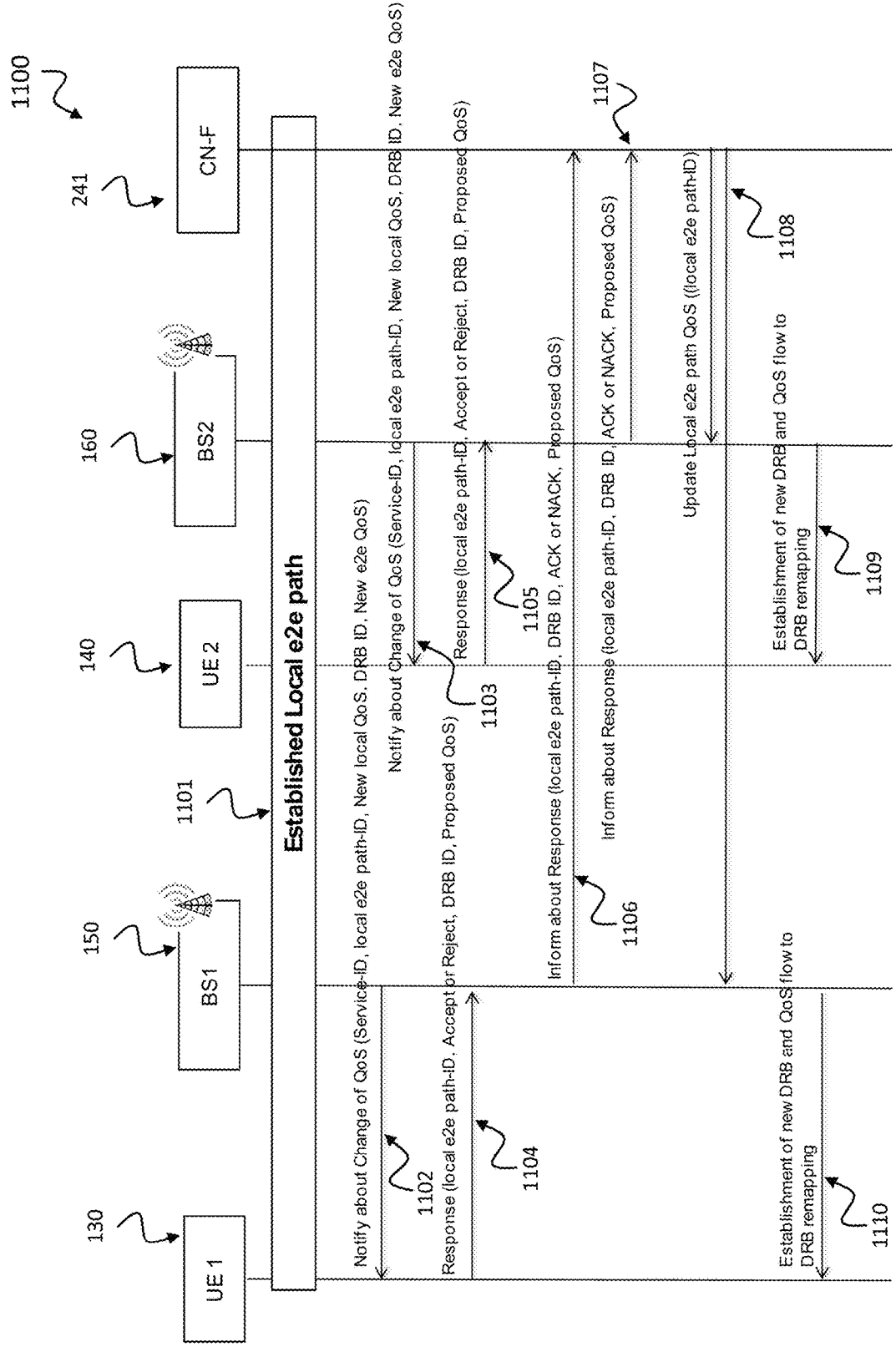
FIG. 11 shows a schematic diagram illustrating a message sequence chart 1100 for QoS re-negotiation between the network and the UEs according to the disclosure.

FIG. 11 shows a schematic diagram illustrating a message sequence chart 1100 for QoS re-negotiation between the network and the UEs according to the disclosure.

The network notifies the involved UEs 130, 140 (e.g., vehicles 130, 140 as shown in FIG. 1) about the expected change of the QoS according to the outcomes of the prediction function and based on the agreement achieved after the coordination among the BSs 150, 160 that form the "local e2e" path (e.g. local e2e path 490 shown in FIGS. 4 to 6). The early notification (i.e., before the actual change of the QoS) for the change of the QoS allows the applications of the UEs 130, 140 (e.g. modules 431, 441 shown in FIGS. 4 to 6) to modify their configuration and behaviour, considering the expected QoS.

FIG. 11 presents an implementation example of the QoS Re-Negotiation between the network and the UEs 130, 140. The "Notify about Change of QoS" message 1102, 1103 that is sent by the BS 150, 160 to the UEs 130, 140 includes the identifier of the Service, the "local e2e" path and the proposed QoS either for the whole part of the path (New e2e QoS) or for a specific wireless link of the path (New local QoS). An optional field for this message is the timeframe that the Change of QoS should take place.

The UEs 130, 140 after the appropriate application layer checks provide an accept or reject response on the proposed QoS change (Response message 1104, 1105). Another response may include the proposal of alternative QoS (Proposed QoS field). The network collects all the responses sent by the UEs 130, 140 that are using the "local e2e" path. In the case of universal acceptance then the network triggers the execution of the update 1108 of the local e2e path (e.g., change DRB, change configuration of selected bearers). In the case of rejection or if a new proposed QoS is provided to the network, then the network and the involved BS have to coordinate again or to start the process of releasing the "local e2e" path.

The re-configuration of the "local e2e" path is modified only after the acceptance by the involved UEs 130, 140 of the "early notification" about the QoS that can be supported.

Figure 12:
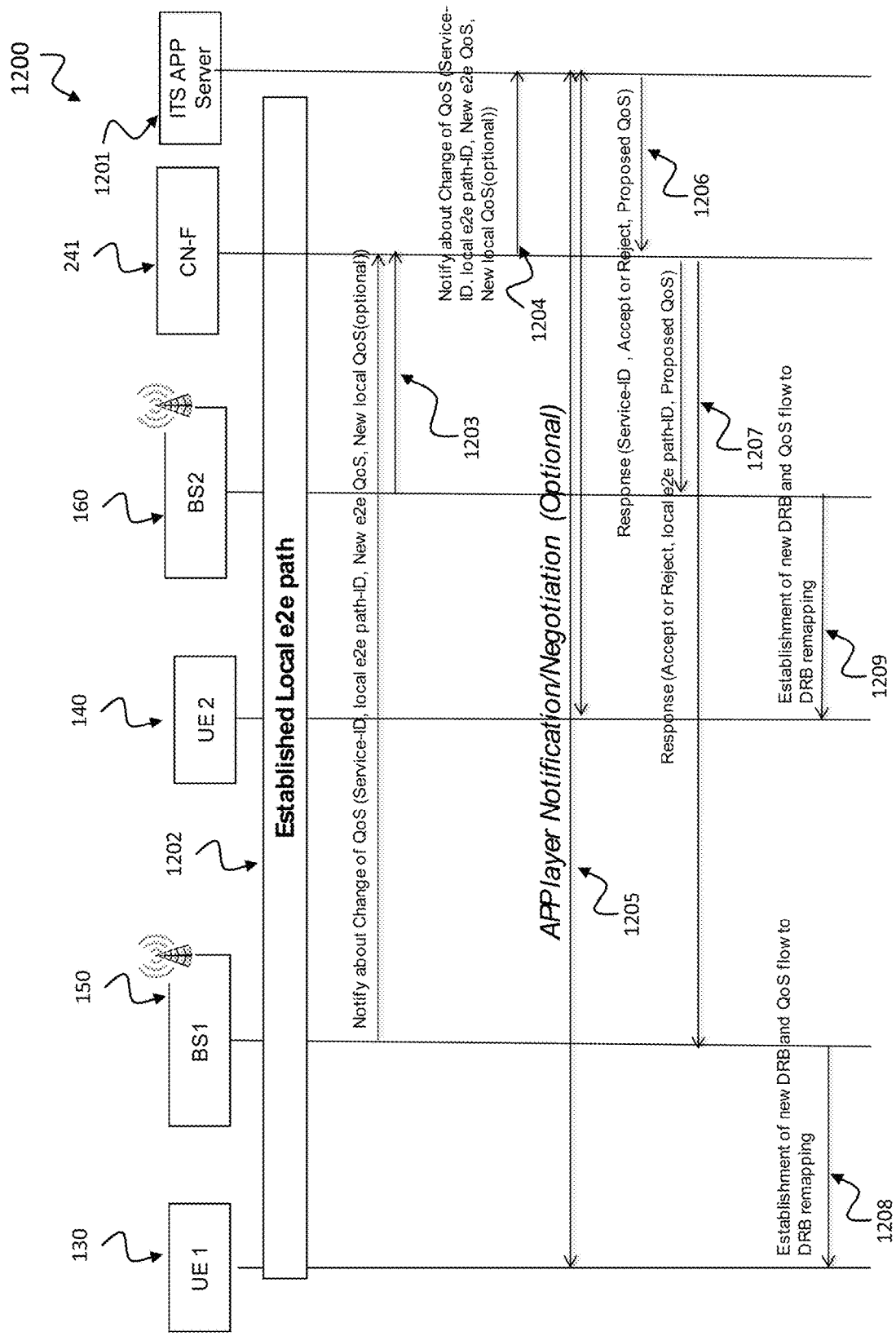
FIG. 12 shows a schematic diagram illustrating a message sequence chart 1200 for QoS re-negotiation between the network and the application server according to the disclosure.

FIG. 12 shows a schematic diagram illustrating a message sequence chart 1200 for QoS re-negotiation between the network and the application server according to the disclosure. FIG. 12 presents another implementation example of the QoS Re-Negotiation between the network and an application server (e.g., ITS application server 1201 in case of V2X communications). In this case the network (e.g., BS 150, 160 and CN-F 241) notifies 1204 early enough and negotiates with the ITS Application Server 1201 about the expected QoS change (data rate, delay, reliability)). The difference comparing to the above example is that the application server 1201 is responsible for the assessment of the impact that the QoS change of the communication layer will have on the behaviour of the supported application.

Based on the response 1206 by the ITS App Server 1201 about the QoS change (i.e., accept, reject, new QoS proposal), the network will proceed (or not) with the expected re-configuration of the "local e2e" path. Again, the configuration of the "local e2e" path is modified only after the acceptance by the application server of the "early notification" about the QoS that can be supported. In the specific implementation example a Core Network (CN) entity 241 is the interface with the Application Server 1201. For instance, as it is described in FIG. 3, in 5G networks, the Application Server 1201 can receive the notification from the Application Function (AF) 308. The AF 308 and the Application Server 1201 can also be collocated. The AF 308 can receive the notification from the PCF 307 or in another implementation (see FIG. 3) the AF 308 can directly receive the notification from the AMF function.

The pro-active RAN Adaptation for Guaranteed-QoS E2E path Continuity can be triggered by the UE 130, 140, when dynamic changes have been predicted at the UE side (e.g., change of vehicle conditions). After a UE-based local prediction for expected change of QoS conditions, a DRB update request message is sent from the UE 130, 140 to the BS 150, 160 (including the list of recommended DRBs, the priorities of DRBs and the prediction cause). Based on the UE-triggered local prediction the BSs 150, 160 that form the "local e2e" path undertake to agree on updated DRBs and/or configurations (using a scheme presented above with respect to FIGS. 9 and 10). The changes of the supported QoS and the updated configuration of the "local e2e" path are notified to the involved UEs ("Notify QoS Change" message with the proposed DRB). Similarly to the previous implementation example (see FIGS. 11 and 12) the actual re-configuration of the "local e2e" path takes place only after the acceptance by the involved UEs of the "early notification" about the QoS that can be supported.

Figure 13:
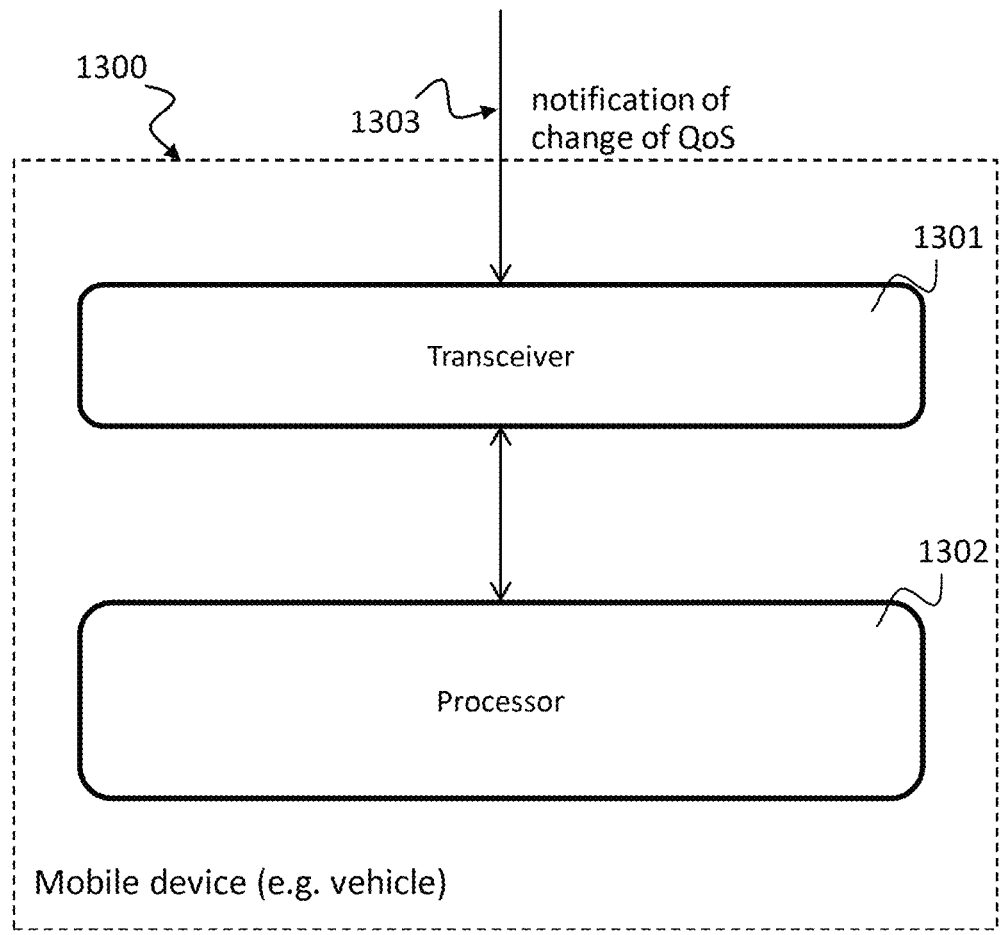
FIG. 13 shows a block diagram illustrating an exemplary mobile device 1300 according to the disclosure.

FIG. 13 shows a block diagram illustrating an exemplary mobile device 1300 according to the disclosure. The mobile device 1300 may be a vehicle, for example a vehicle 130, 140 or a user equipment as described above with respect to FIGS. 1 to 12. The mobile device 1300 includes a transceiver 1301 and a processor 1302.

The transceiver 1301 is configured to receive from a network a notification 1303, e.g. a notification 131, 141 as described above with respect to FIGS. 1 to 12, of an estimated and/or expected change of a Quality-of-Service, QoS related to a local end-to-end data communication path, e.g. a communication path 490 as described above with respect to FIGS. 1 to 12. The processor 1302 is configured to trigger and/or apply the change of QoS of the local end-to-end data communication path 490.

The notification 1303, 131, 141 may be received upon request of the mobile device 1300 or automatically from the network. The local end-to-end data communication path 490 may include radio data paths for transmission, in particular user plane or control plane transmission, among the two mobile devices 130, 140 established via one or more base stations 150, 160 serving the two mobile devices 130, 140, e.g. as described above with respect to FIGS. 1 to 12, in particular without participation of core network nodes in the user plane transmission.

The change of the QoS may be based on one or more of the following parameters of the local end-to-end data communication path 490: latency, data rate, reliability, packet-loss, coverage level, jitter.

The processor 1302 may transmit a report 433, 443 to the network, e.g. as described above with respect to FIGS. 1 to 12. The report 433, 443 comprises at least one of the following information: location information, application layer information, mobile device status information, experienced QoS at mobile device side, radio channel conditions, e.g. as described above with respect to FIGS. 1 to 12.

The notification 1303, 131, 141 from the network may comprise notification about new QoS choices based on prediction, notification that a current QoS for the local end-to-end data communication path cannot be supported and/or notification that the current QoS can be fulfilled by a modification of the QoS of one or more local links of the local end-to-end data communication path.

The processor 1301 may respond to a notification 1303, 131, 141 from the network about an estimated and/or expected change of the QoS related to the local end-to-end data communication path 490 in order to enable the mobile device 1300, 130, 140 to accept or decline the change, e.g. as described above with respect to FIGS. 1 to 12.

The processor 1301 may predict a change of the local end-to-end data communication path 490 based on a change of conditions at the mobile device 1300 and may request the network to modify the local end-to-end data communication path 490 based on the predicted change, e.g. as described above with respect to FIGS. 1 to 12.

Figure 14:
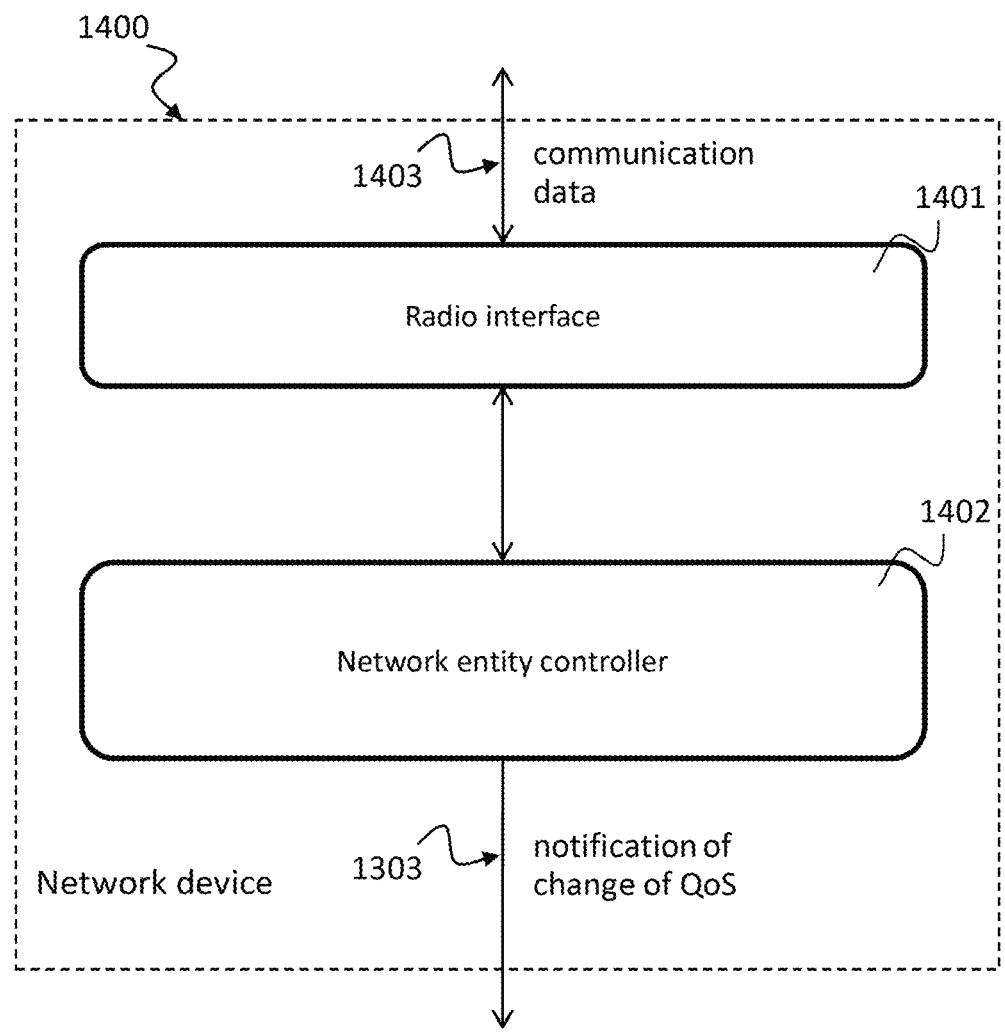
FIG. 14 shows a block diagram illustrating an exemplary network entity 1400 according to the disclosure.

FIG. 14 shows a block diagram illustrating an exemplary network device or entity 1400 according to the disclosure. The network device 1400 may be a base station or a mobility management entity, e.g. an entity as described above with respect to FIG. 1 to 13 or another entity located in the network. The network device 1400 includes a radio interface 1401 and a network entity controller 1402.

The radio interface 1401 is configured to transceive communication data 1403 via a communication path, in particular a local end-to-end data communication path between a mobile device 1300 and another mobile device, based on a Quality-of-Service, QoS, requirement for the communication path, e.g. as described above with respect to FIGS. 1 to 13. The network entity controller 1402 is configured to notify 1303 the mobile device 1300 about an expected or estimated change of the QoS related to the communication path, e.g. as described above with respect to FIGS. 1 to 13.

The network entity controller 1402 may notify 1303 an application server about an expected or estimated change of the QoS of the communication path, e.g. as described above with respect to FIGS. 1 to 13. The network entity controller 1402 may predict the change of QoS, e.g. as described above with respect to FIGS. 1 to 13. The notification 1303 may comprise notification about new QoS choices based on prediction, notification that a current QoS for the local end-to-end data communication path cannot be supported and/or notification that the current QoS can be fulfilled by a modification of the QoS of one or more local links of the local end-to-end data communication path, e.g. as described above with respect to FIGS. 1 to 13. The network entity controller 1402 may transmit the notification 1303 to network entities that form the communication path, in particular the local end-to-end data communication path, and may apply the change of the QoS based on a response from the network entities that form the communication path, e.g. as described above with respect to FIGS. 1 to 13.

The network device 1400 may coordinate the network entities that form the communication path to select an appropriate configuration of the local end-to-end data communication path for the changed QoS or to maintain the current QoS based on the received notification 1303, e.g. as described above with respect to FIGS. 1 to 13. As describe above with respect to the mobile device in FIG. 13, the communication path may include radio data paths for transmission, in particular user plane or control plane transmission, among two or more mobile devices established via one or more base station, in particular without participation of core network nodes in the user plane transmission, e.g. as described above with respect to FIGS. 1 to 13.

The network entity controller 1400 may transmit the notification 1303 upon request of the mobile device 1300 or automatically. A change of the QoS requirement may be based on one or more of the following parameters of the communication path: latency, data rate, reliability, packet-loss, coverage level, Jitter.

The network entity controller 1402 may be configured to: receive a request for activation of a prediction service for predicting a change of the QoS over a local end-to-end data communication path; and to decide whether to accept the request, reject the request or provide an alternative forecast period, e.g. as described above with respect to FIGS. 1 to 13.

The network entity controller 1402 may—in case of acceptance—configure a reporting periodicity to enable the prediction. The network entity controller 1402 may—in case of rejection—provide a reason for the rejection and/or an provide alternative forecast period, e.g. as described above with respect to FIGS. 1 to 13.

The network device 1400 may include a processor that is configured to run a prediction service. The prediction service is configured to enable the network entity controller 1402 to notify 1303 the mobile device 1300 about the estimated and/or expected change of the QoS related to the communication path, e.g. as described above with respect to FIGS. 1 to 13.

The prediction service may be initiated automatically or periodically or event-driven, in particular upon request of the mobile device 1300. The prediction service may be configured to enable a prediction of the QoS related to the communication path based on mobility information and/or application behavior of one or more mobile devices, map information and/or network information.

The prediction of the QoS related to the communication path may be based on a reporting period in which the network device receives reports from the mobile devices and other network devices, in particular base stations that establish the local end-to-end data communication path, e.g. as described above with respect to FIGS. 1 to 13.

The reports from the mobile devices may comprise location information, application layer information, mobile device status information, experienced QoS at mobile device side and/or radio channel conditions. The reports from the base stations may comprise scheduling information, backhaul link information, experienced QoS and/or communication QoS of inter base station links, e.g. as described above with respect to FIGS. 1 to 13.

The prediction service may be centrally provided by a dedicated network entity, hierarchically provided by the dedicated network entity which is supported by local base station entities; or provided in a distributed mode by the local base station entities, e.g. as described above with respect to FIGS. 1 to 13. The prediction service may be provided based on a prediction function that determines a prediction about an expected QoS of the communication path based on information collected from the mobile devices and/or base stations establishing the communication path, e.g. as described above with respect to FIGS. 1 to 13.

The network entity controller 1402 may notify 1303 the mobile device 1300 about an estimated or expected change of the QoS related to the communication path, e.g. as described above with respect to FIGS. 1 to 13. The network entity controller 1402 may notify 1303 an application server about an estimated and/or expected change of the QoS related to the communication path, e.g. as described above with respect to FIGS. 1 to 13.

Figure 15:
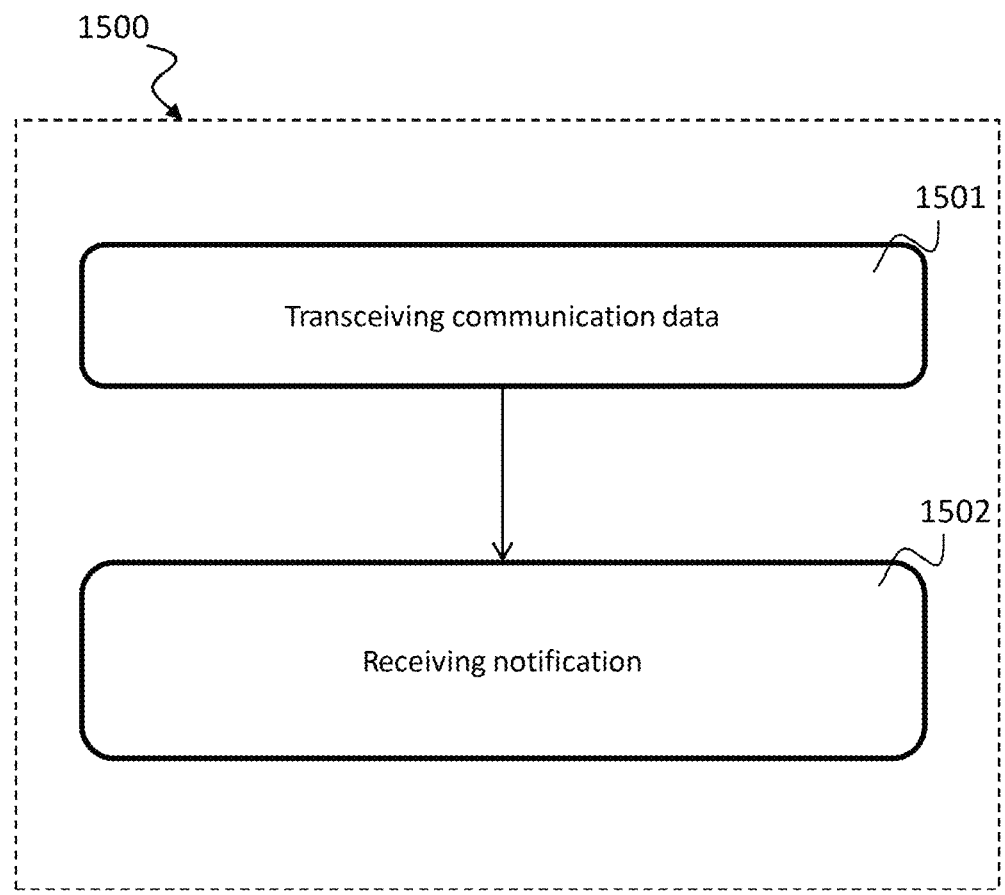
FIG. 15 shows a schematic diagram illustrating an exemplary method 1500 for notifying a change of QoS according to the disclosure.

FIG. 15 shows a schematic diagram illustrating an exemplary method 1500 for notifying an estimated and/or expected change of QoS related to a communication path according to the disclosure. The method 1500 includes transceiving 1500 communication data via a communication path, in particular a local end-to-end data communication path between a mobile device and another mobile device, based on a Quality-of-Service, QoS, requirement related to the communication path, e.g. as described above with respect to FIGS. 1 to 14.

The method 1500 further includes receiving 1502, from a network, notification of an estimated or expected change of the QoS related to the communication path, e.g. as described above with respect to FIGS. 1 to 14. The method 1500 may be performed on a mobile device, e.g. a mobile device as described above with respect to FIG. 1 to 14 or on a network device, e.g. a network device as described above with respect to FIG. 1 to 14, or on another entity.

The presented solution is based on a unique signaling in the radio interface, N2 interface and Xn interfaces which involves exchange of new messages; messages that are already available are enhanced with new content as well. Additionally the interactions among the different network entities (user equipment, BSs, Mobility Management) involve unique messages exchanges and introduction of new network functions. All the afore messages and entities are relevant to standardization (including e.g., Request for Establishment of local e2e path, Prediction Reporting Configuration, Prediction Request Reject, Vehicle Periodic Reporting, BS Periodic Reporting, Notify about predicted "local e2e" path Quality change, Notify that "local e2e" QoS can be supported by specific change etc.).

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A mobile device comprising:
    a processor, a non-transitory memory storing program instructions for execution by the processor, and a transceiver;
    wherein when the program instructions are executed by the processor,
        the transceiver is configured, in coordination with the processor, to:
            transmit a request for activation of a prediction service for predicting a change of the QoS over a local end-to-end data communication path;

receive from a network device a notification of predicted change of a Quality-of-Service (QoS) related to a local end-to-end data communication path, wherein the network device determines whether to accept the request, reject the request or provide an alternative forecast period; and the processor is configured to provide a report to the network, the report comprising at least one of: location information, application layer information, mobile device status information, experienced QoS at mobile device side, and radio channel conditions.

2. The mobile device of claim 1,
wherein the local end-to-end data communication path comprises radio data paths for transmission, in particular user plane or control plane transmission, among the two mobile devices established via one or more base stations serving the two mobile devices, in particular without participation of core network nodes in the user plane transmission.

3. The mobile device of claim 1,
wherein the change of the QoS is based on one or more of the following parameters of the local end-to-end data communication path: latency, data rate, reliability, packet-loss, coverage level, and jitter.

4. The mobile device of claim 1, wherein the notification from the network comprises at least one of the following:
notification about new QoS choices based on prediction,
notification that a current QoS of the local end-to-end data communication path cannot be supported, and
notification that the current QoS can be maintained by a reconfiguration of the QoS of one or more links of the local end-to-end data communication path.

5. The mobile device of claim 1, wherein when the program instructions are executed by the processor,
the processor is configured to respond to a notification from the network about predicted change of the QoS related to the local end-to-end data communication path in order to enable the mobile device to accept or decline the change.

6. The mobile device of claim 1, wherein when the when the program instructions are executed by the processor,
the processor is configured to predict a change of the QoS of the local end-to-end data communication path based on a change of conditions at the mobile device and to request the network to reconfigure the local end-to-end data communication path based on the predicted QoS change.

7. A network device comprising:
a processor, a non-transitory memory storing program instructions for execution by the processor and a transceiver;
wherein when the program instructions are executed by the processor, the network device is configured to:
transceive communication data via a communication path based on a Quality-of-Service, QoS, requirement for the communication path, wherein the communication path is a local end-to-end data communication path between a mobile device and another mobile device;
receive a request for activation of a prediction service for predicting a change of the QoS over a local end-to-end data communication path;
determine whether to accept the request, reject the request or provide an alternative forecast period; and
predict the change of the QoS and notify the mobile device about the predicted change of the QoS related to the communication path.

8. The network device of claim 7,
wherein the network device is configured to notify an application server about predicted change of the QoS of the communication path.

9. The network device of claim 7,
wherein the notification comprises at least one of the following:
notification about new QoS choices based on prediction,
notification that a current QoS of the local end-to-end data communication path cannot be supported, and
notification that the current QoS can be maintained by a reconfiguration of the QoS of one or more local links of the local end-to-end data communication path; and
wherein the network device is configured to transmit the notification to network entities that form the communication path and to apply the change of the QoS based on a response from the network entities that form the communication path.

10. The network device of claim 7,
wherein the communication path comprises radio data paths for transmission, among two or more mobile devices established via one or more base station without participation of core network nodes in a user plane transmission.

11. The network device (1400) of claim 7,
wherein a change of the QoS requirement is based on one or more of the following parameters of the communication path: latency, data rate, reliability, packet-loss, coverage level, and jitter.

12. The network device of claim 7, wherein the network device is configured:
to configure a reporting periodicity to enable the prediction when the request is accepted, and
provide a reason for the rejection and/or an provide alternative forecast period when the request is rejected.

13. The network device of claim 7,
wherein the prediction of the change of QoS related to the communication path is based on at least one of mobility information, application behavior of one or more mobile devices, map information and network information.

14. The network device of claim 13,
wherein the prediction of the QoS related to the communication path is based on a reporting period in which the network device receives reports from the mobile devices and other network devices, wherein the other network devices are base stations that establish the local end-to-end data communication path.

15. The network device of claim 14,
wherein the reports from the mobile devices comprise at least one of: location information, application layer information, mobile device status information, experienced QoS at mobile device side, and radio channel conditions; and
wherein the reports from the base stations comprise at least one of the following: scheduling information, backhaul link information, experienced QoS, and communication QoS of inter base station links.

16. A method for notifying a predicted change of QoS related to a communication path, the method comprising:
transceiving communication data via a communication path based on a Quality-of-Service, QoS, requirement related to the communication path, wherein the communication path a local end-to-end data communication path between a mobile device and another mobile device;

receive a request for activation of a prediction service for predicting a change of the QoS over a local end-to-end data communication path;

determine whether to accept the request, reject the request or provide an alternative forecast period; and receiving, from a network, notification of a predicted change of the QoS related to the communication path.

\* \* \* \* \*

UNITED STATES PATENT AND TRADEMARK OFFICE
CERTIFICATE OF CORRECTION

PATENT NO. : 11,368,879 B2
APPLICATION NO. : 16/859679
DATED : June 21, 2022
INVENTOR(S) : Kousaridas et al.

It is certified that error appears in the above-identified patent and that said Letters Patent is hereby corrected as shown below:

On the Title Page

Item (63), Related U.S. Application Data, "Continuation of application No. PCT/EP2107/077462, filed on Oct. 26, 2017." should read -- Continuation of application No. PCT/EP2017/077462, filed on Oct. 26, 2017. --.

Signed and Sealed this
Twenty-fifth Day of October, 2022

Katherine Kelly Vidal
*Director of the United States Patent and Trademark Office*